(12) United States Patent
Jin et al.

(10) Patent No.: US 8,017,542 B2
(45) Date of Patent: Sep. 13, 2011

(54) METHOD FOR PRODUCTION OF DOPED TITANIUM OXIDE, DOPED TITANIUM OXIDE, AND VISIBLE LIGHT-RESPONSIVE PHOTOCATALYST COMPRISING THE DOPED TITANIUM OXIDE

(75) Inventors: Ren-Hua Jin, Sakura (JP); Pei-Xin Zhu, Sakura (JP); Norimasa Fukazawa, Sakura (JP)

(73) Assignees: Kawamura Institute of Chemical Research, Sakura-shi (JP); DIC Corporation, Tokyo (JP)

( * ) Notice: Subject to any disclaimer, the term of this patent is extended or adjusted under 35 U.S.C. 154(b) by 46 days.

(21) Appl. No.: 12/518,957

(22) PCT Filed: Dec. 10, 2007

(86) PCT No.: PCT/JP2007/073773
§ 371 (c)(1),
(2), (4) Date: Jun. 12, 2009

(87) PCT Pub. No.: WO2008/072595
PCT Pub. Date: Jun. 19, 2008

(65) Prior Publication Data
US 2010/0062928 A1  Mar. 11, 2010

(30) Foreign Application Priority Data
Dec. 13, 2006  (JP) ................................. 2006-335659

(51) Int. Cl.
*B01J 31/06* (2006.01)
(52) U.S. Cl. ........................................ 502/159; 524/413
(58) Field of Classification Search .................. None
See application file for complete search history.

(56) References Cited

U.S. PATENT DOCUMENTS

| | | | |
|---|---|---|---|
| 6,524,750 B1 * | 2/2003 | Mansuetto | 429/232 |
| 7,175,911 B2 * | 2/2007 | Zhou et al. | 428/403 |
| 2004/0058149 A1 | 3/2004 | Zhou et al. | |

FOREIGN PATENT DOCUMENTS

| | | |
|---|---|---|
| EP | 1400491 A2 | 3/2004 |
| JP | 09-262482 A | 10/1997 |
| JP | 11-333304 A | 12/1999 |
| JP | 2001-190953 A | 7/2001 |
| JP | 2003-300730 A | 10/2003 |
| JP | 2005-047787 A | 2/2005 |
| JP | 2005-103471 A | 4/2005 |
| JP | 2006-001774 A | 1/2006 |
| JP | 2006-075794 A | 3/2006 |
| JP | 2006-187677 A | 7/2006 |
| JP | 2006-206426 A | 8/2006 |
| JP | 2007-238406 A | 9/2007 |
| WO | WO-2006/030780 A1 | 3/2006 |

OTHER PUBLICATIONS

"Photocatalysis on TiO2 Surfaces: Principles, Mechanisms, and Selected Results" by Linsebigler et al., *Chem. Rev.* 1995, 95, pp. 735-758, 1995 American Chemical Society.
"Visible Light Induced Water Cleavage in Colloidal Solutions of Chromium-Doped Titanium Dioxide Particles [1a]" by Borgarello et al., *J. Am. Chem. Soc.* 1982, 104, pp. 2996-3002.
"Amorphous Microporous Titania Modified with Platinum (IV) Chloride-A New Type of Hybrid Photocatalyst for Visible Light Detoxification" by Zang et al., *J. Phys. Chem. B*. 1998, 102, pp. 10765-10771.
"Modified, Amorphous Titania-A Hybrid Semiconductor for Detoxification and Current Generation by Visible Light**" by Kisch et al., *Angew. Chem. Int. Ed.* 1998. 37, No. 21, pp. 3034-3036.
"Daylight Photocatalysis by Carbon-Modified Titanium Dioxide**", by Sakthivel et al., *Angew. Chem. Int. Ed* 2003, 42, pp. 4908-4911.

* cited by examiner

*Primary Examiner* — Melvin C Mayes
*Assistant Examiner* — Yun Qian
(74) *Attorney, Agent, or Firm* — Edwards Angell Palmer & Dodge LLP

(57) ABSTRACT

The present invention provides a doped titanium oxide having visible light-responsiveness whose structure is specified, and a simple production method thereof. By burning with heat a layered structure composite laminated alternately with polymer and the titania, which is obtained using basic polymer having amino group(s) and water-soluble titanium compound, carbon atoms and nitrogen atoms in the polymer are, doped to the crystalline surface of titanium oxide. As making the polymer complex with metal ions beforehand, the metal ions can be also doped to the titanium oxide.

2 Claims, 23 Drawing Sheets

FIG. 1.1
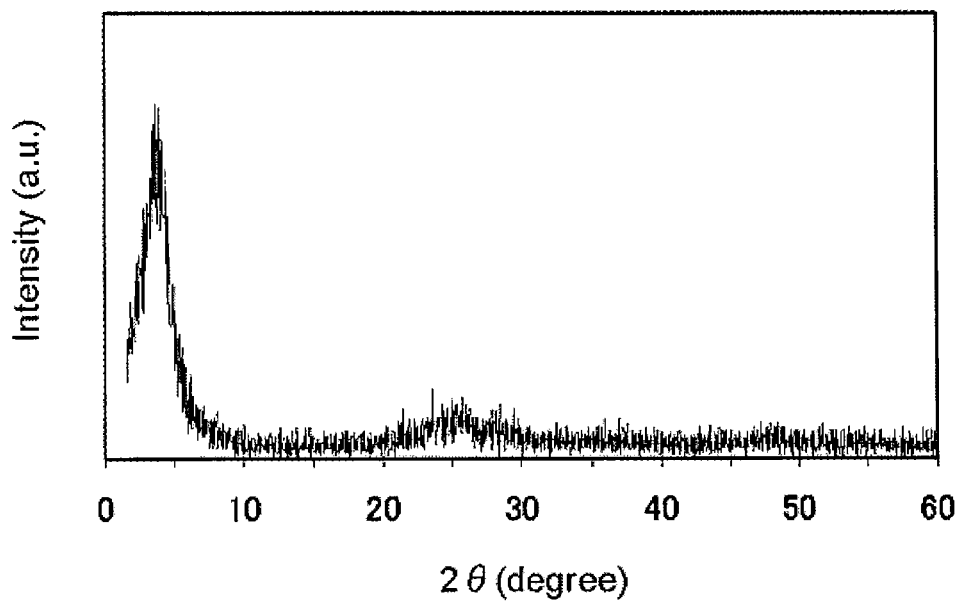
FIG. 1.2
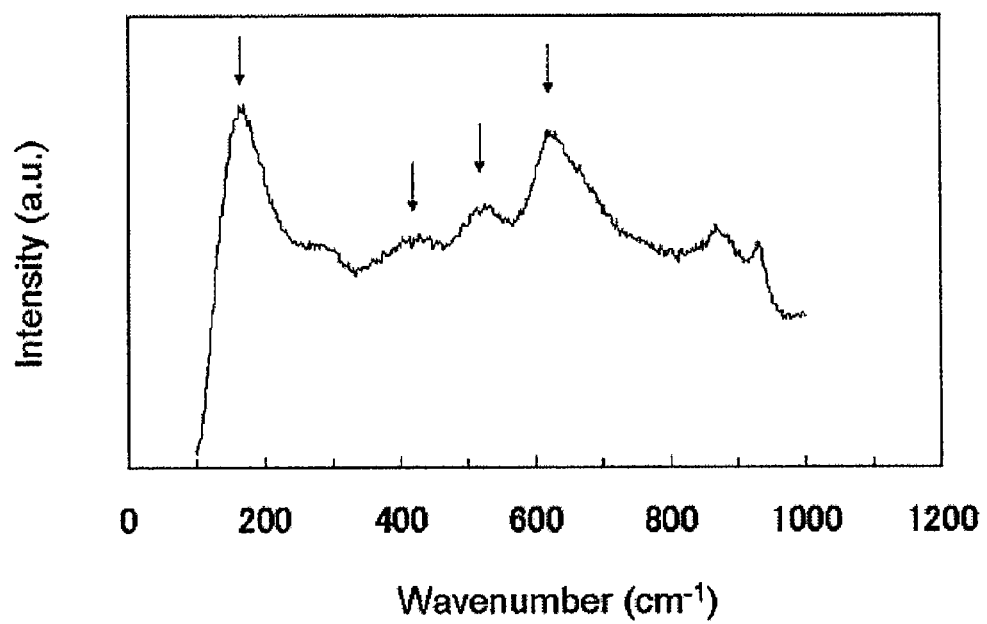

FIG. 1.3
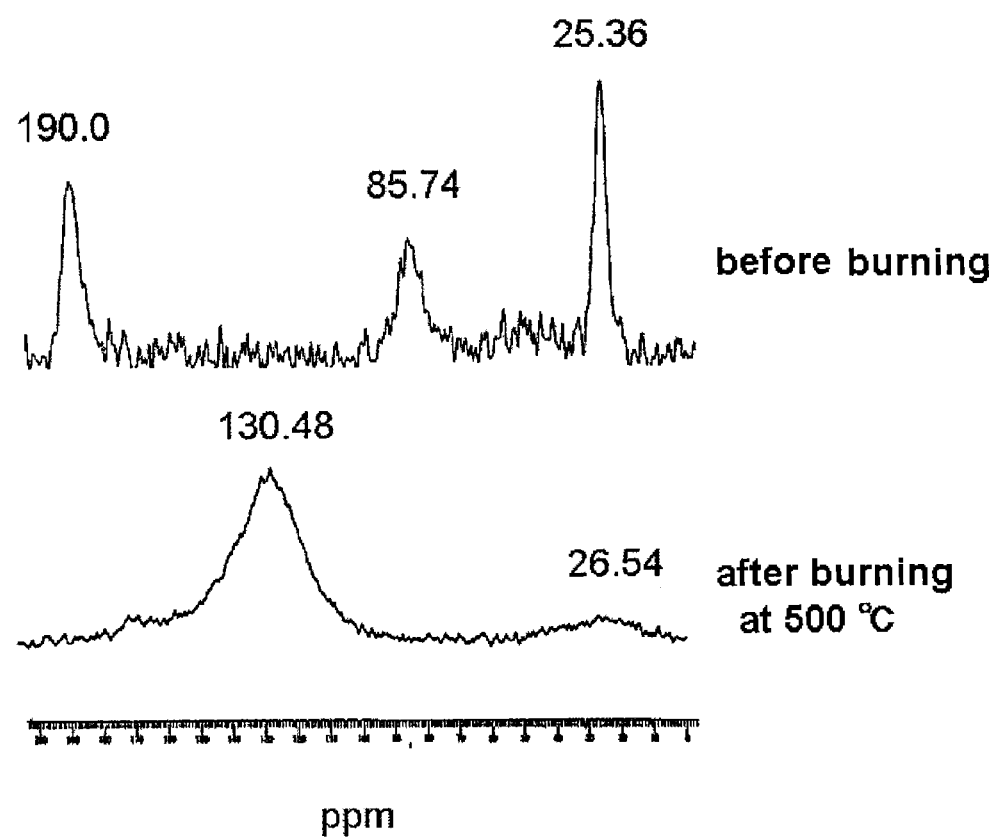

FIG. 2.1
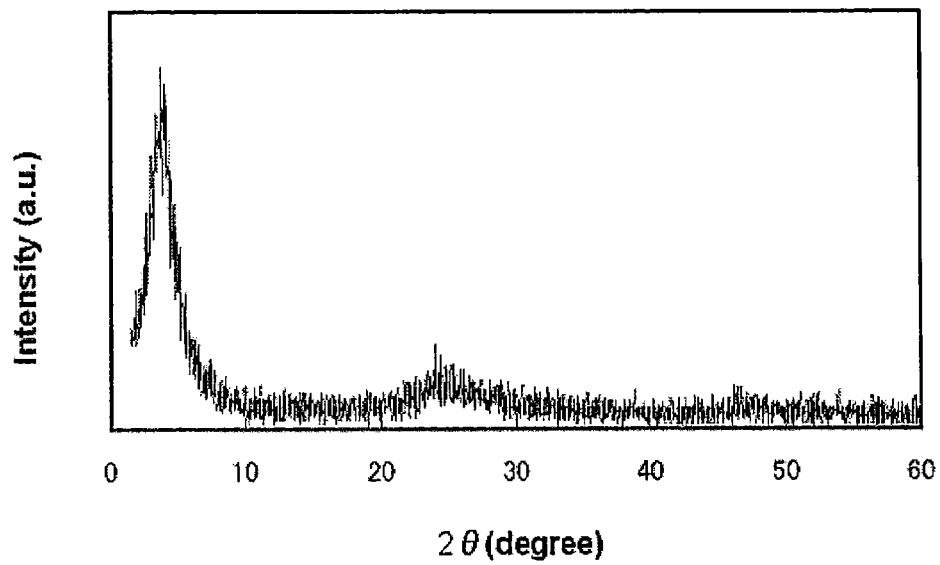
FIG. 2.2
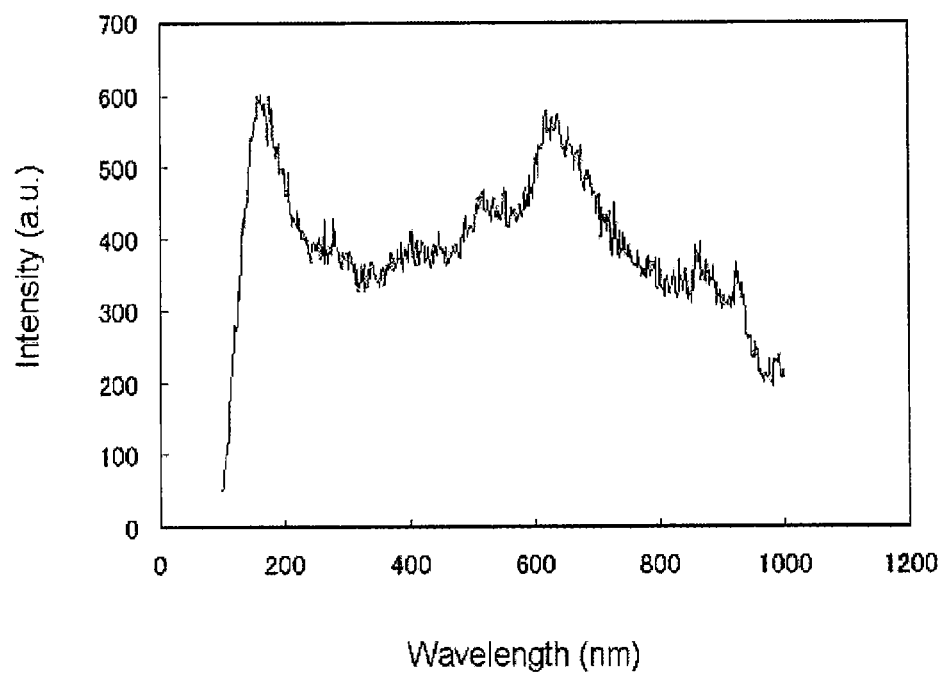

FIG. 2.3
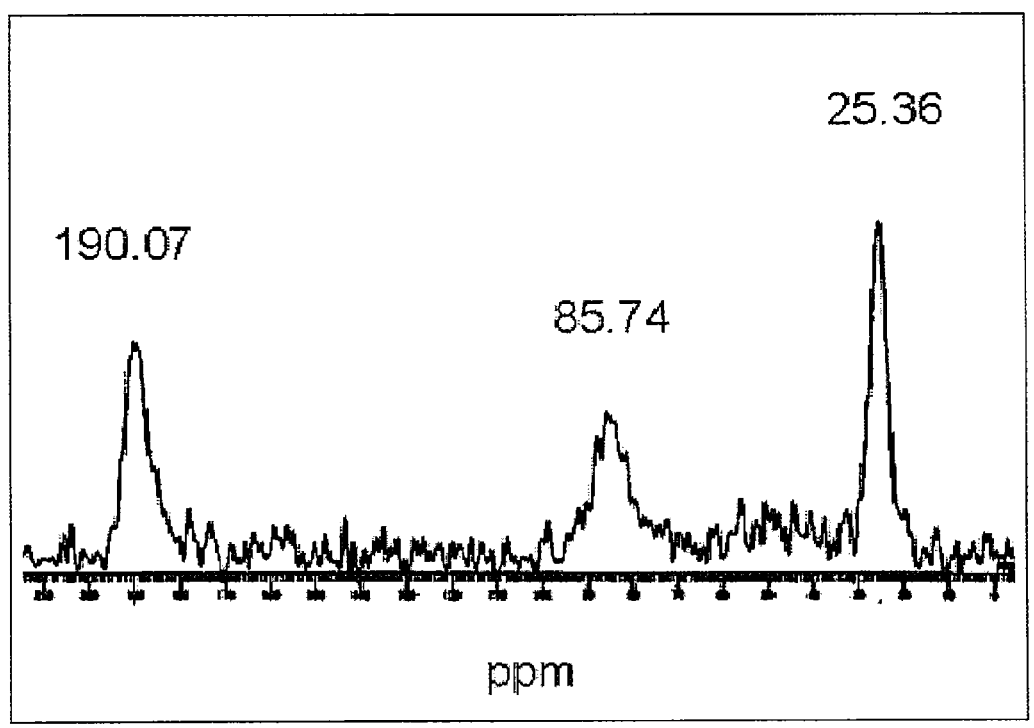

FIG. 3.1
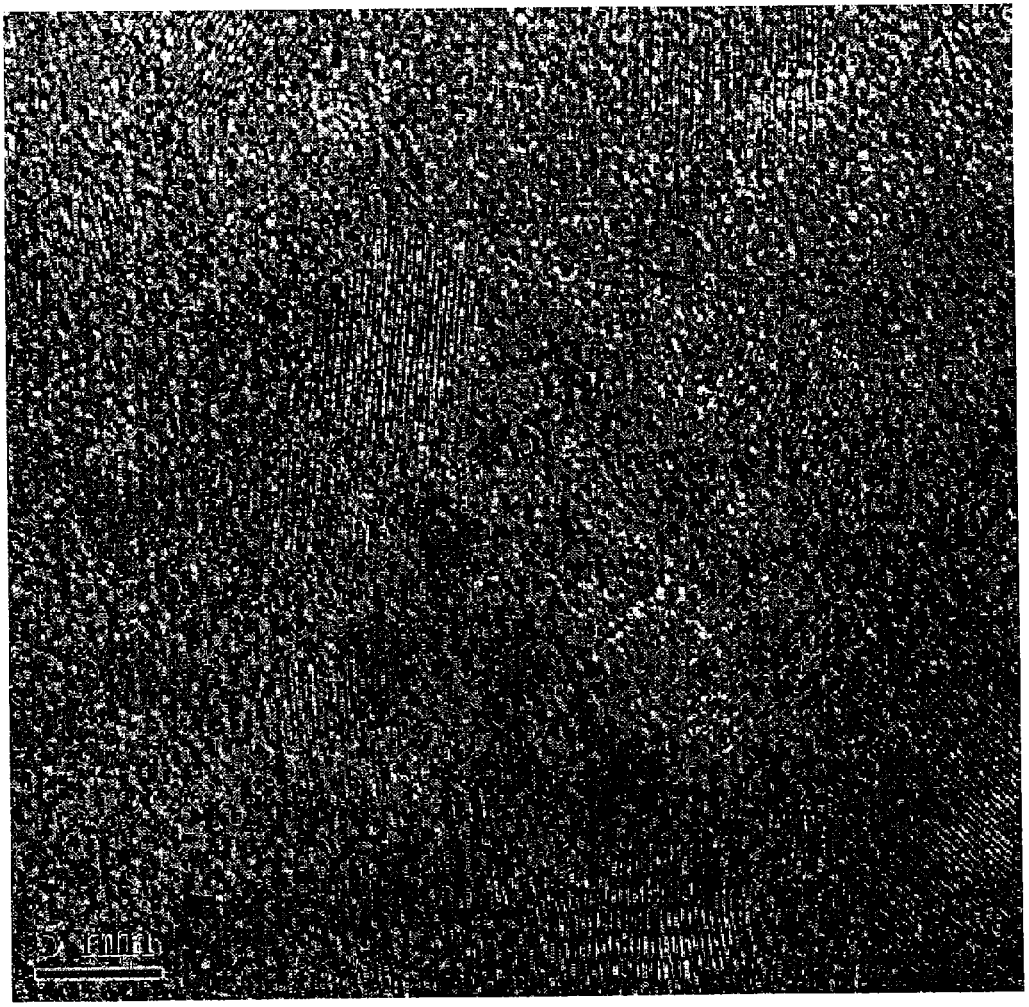

FIG. 3.2
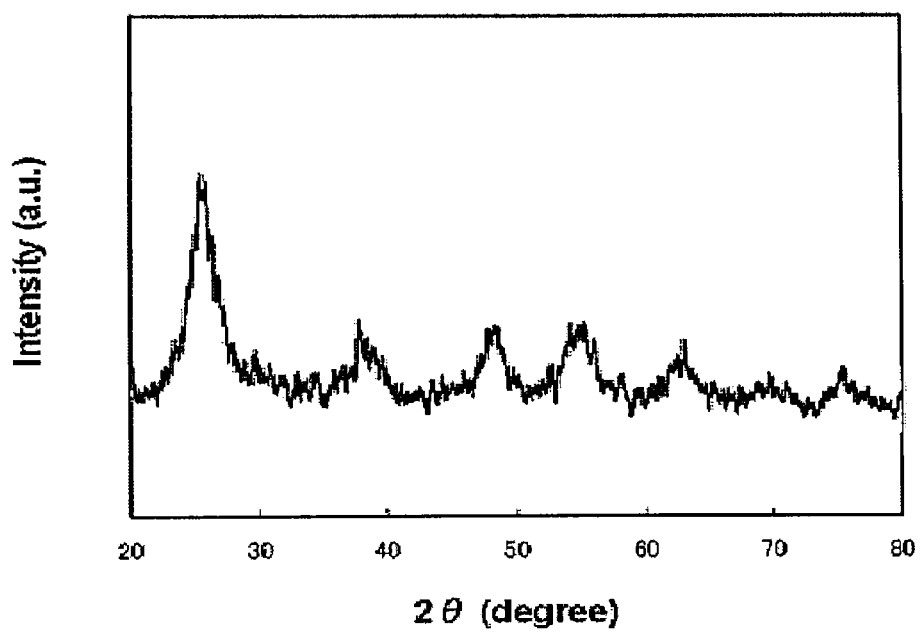
FIG. 3.3
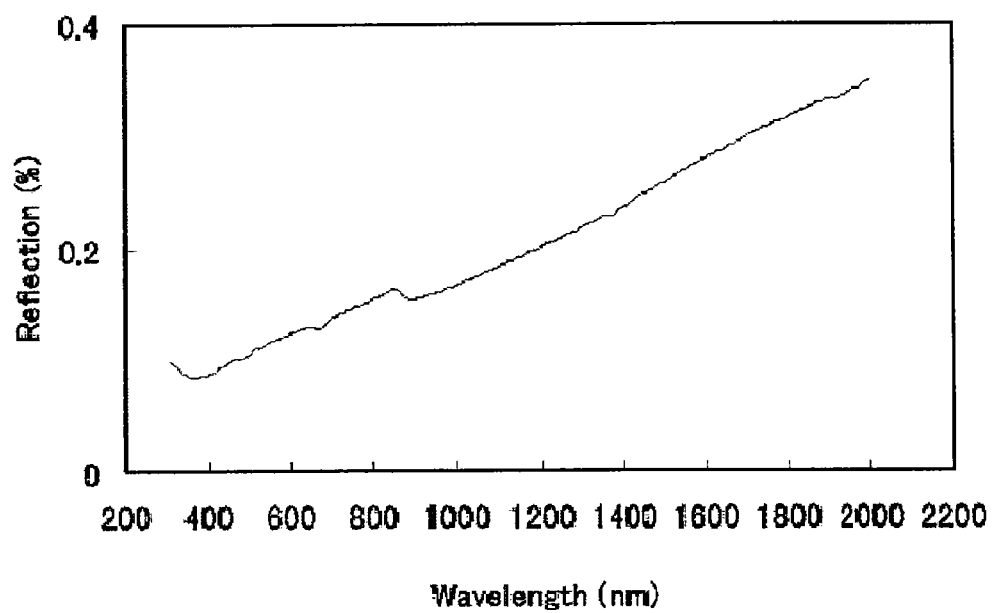

FIG. 3.4
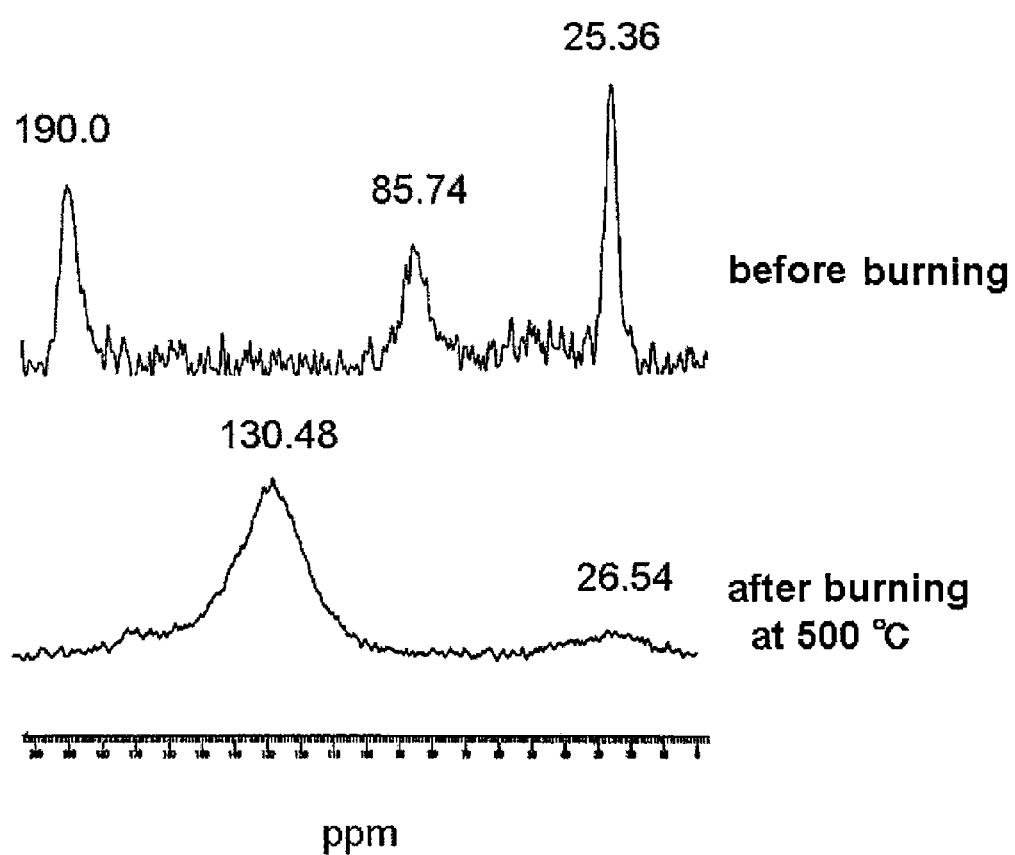

FIG. 3.5
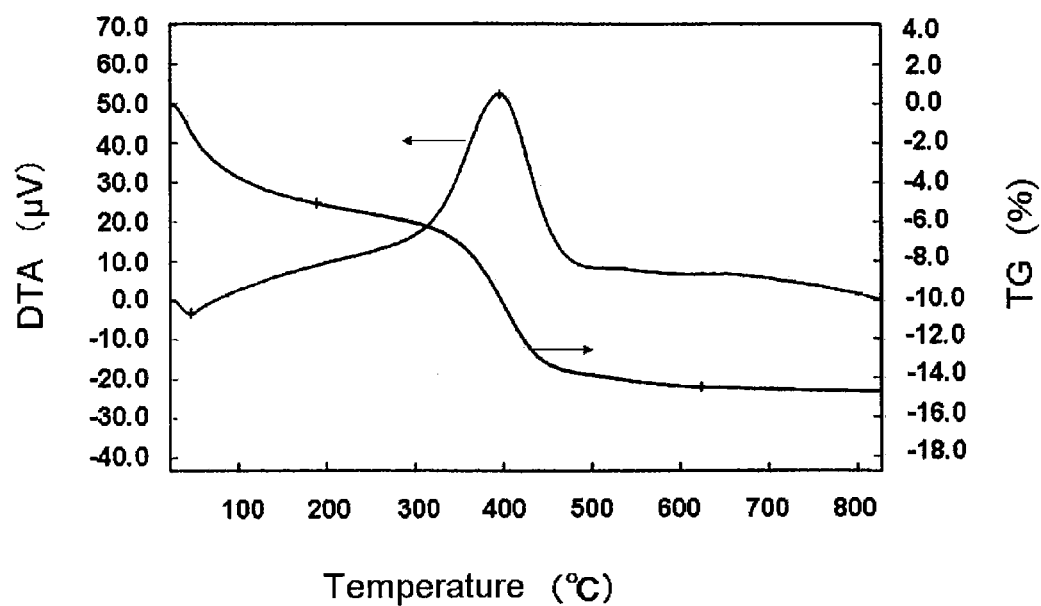

FIG. 3.6
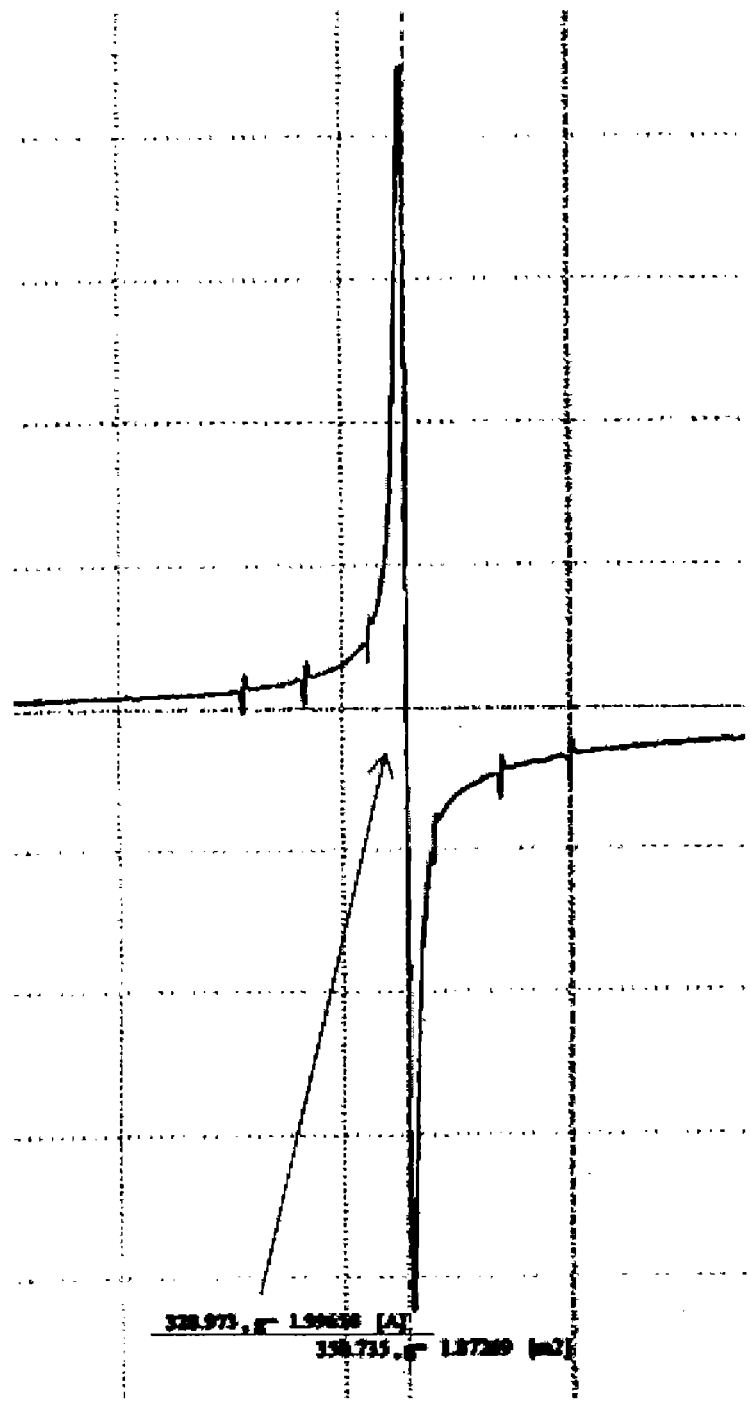

FIG. 4.1
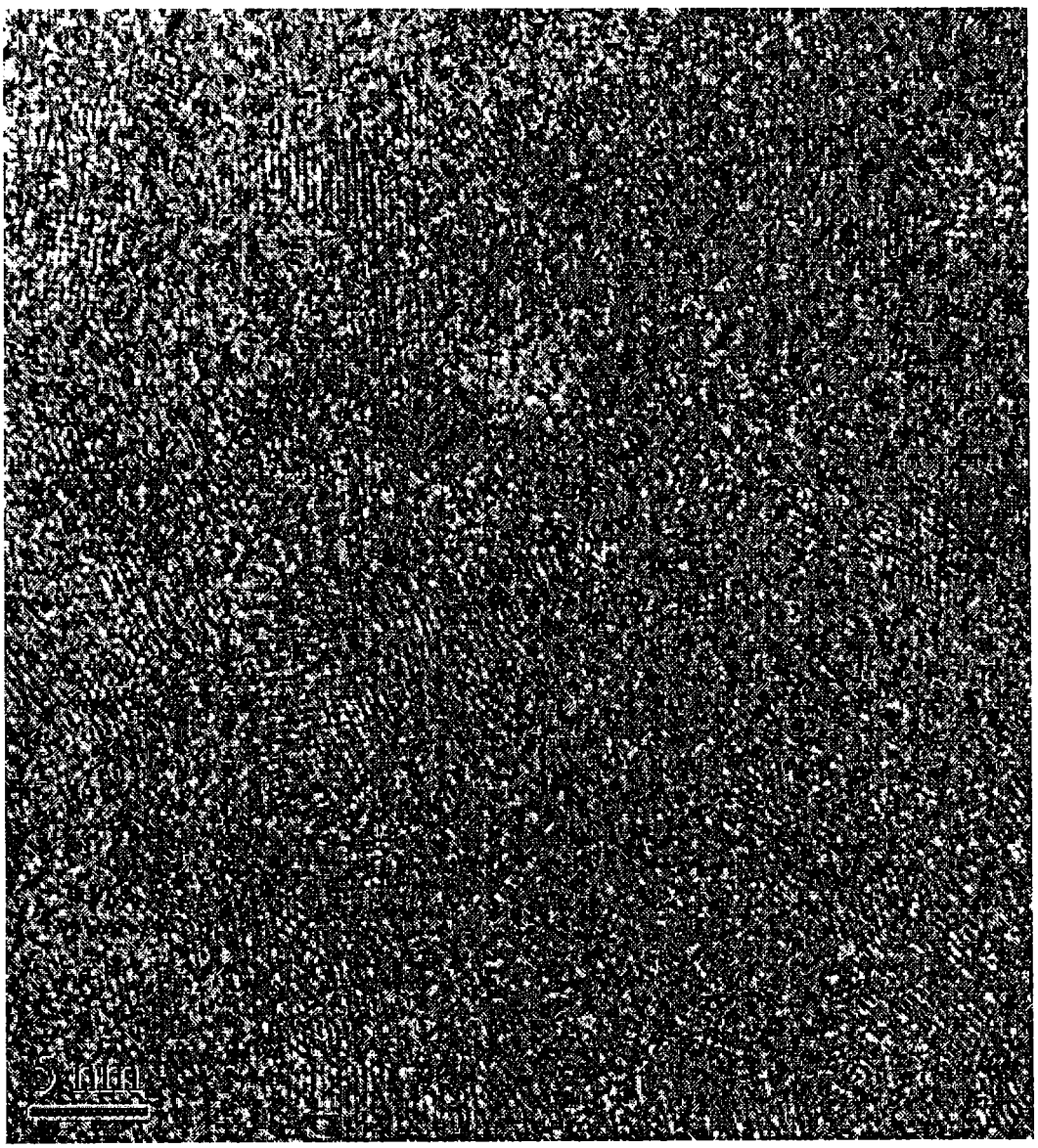

FIG. 4.2
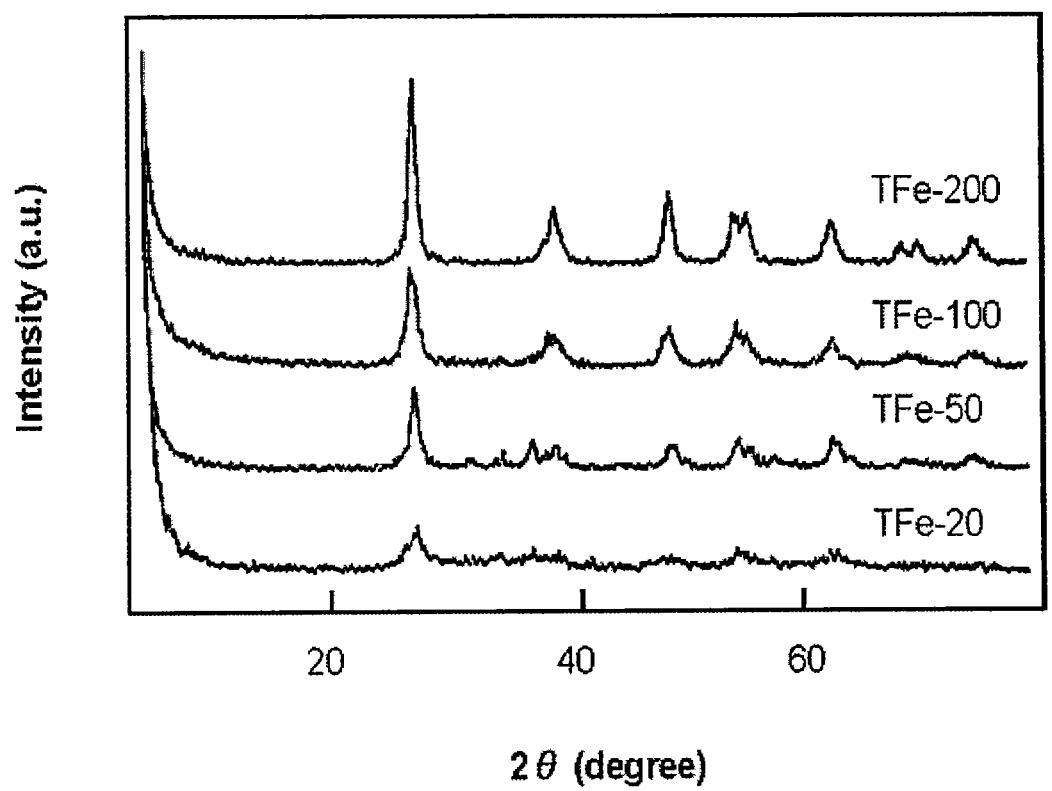

FIG. 4.3
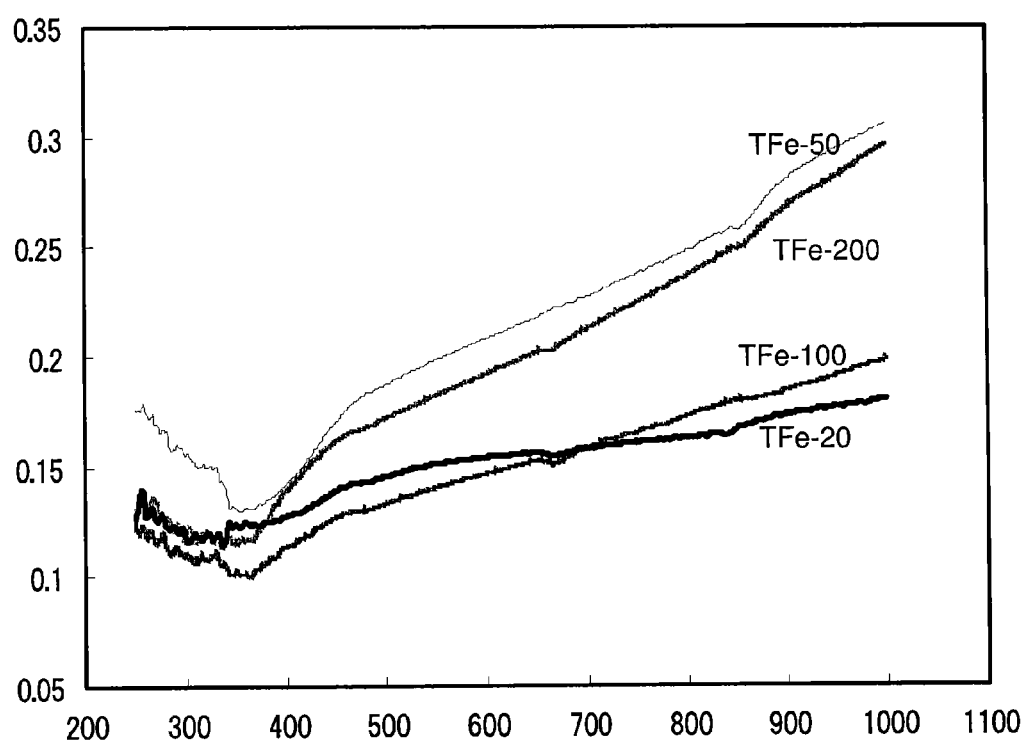

FIG. 4.4
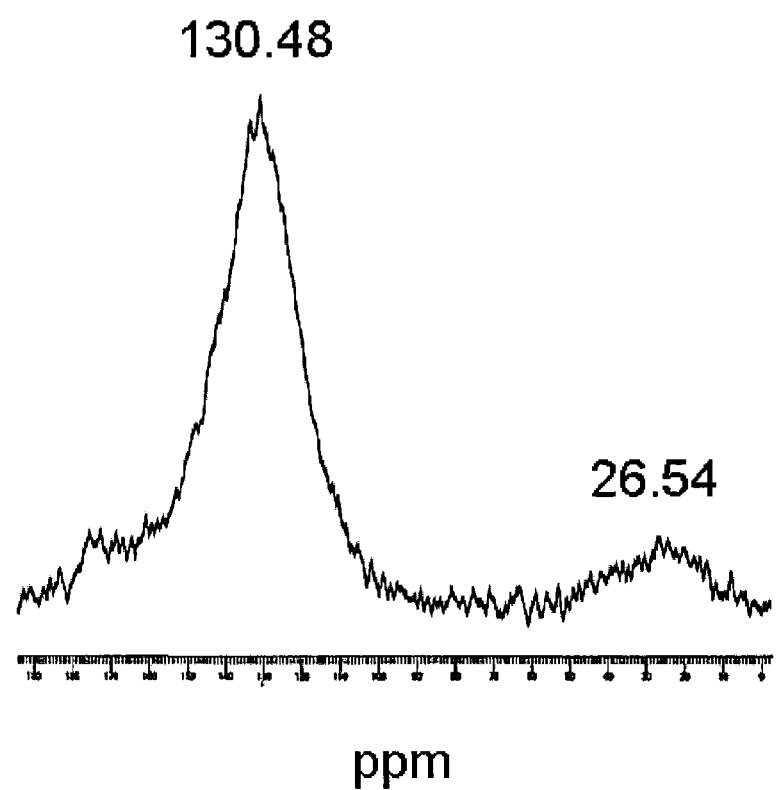
FIG. 4.5
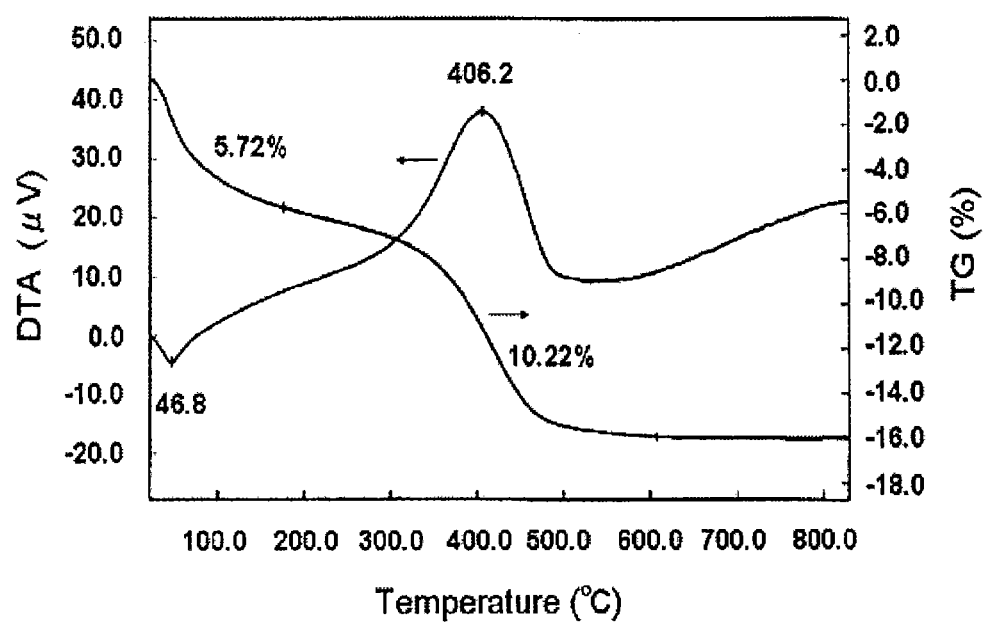

FIG. 4.6
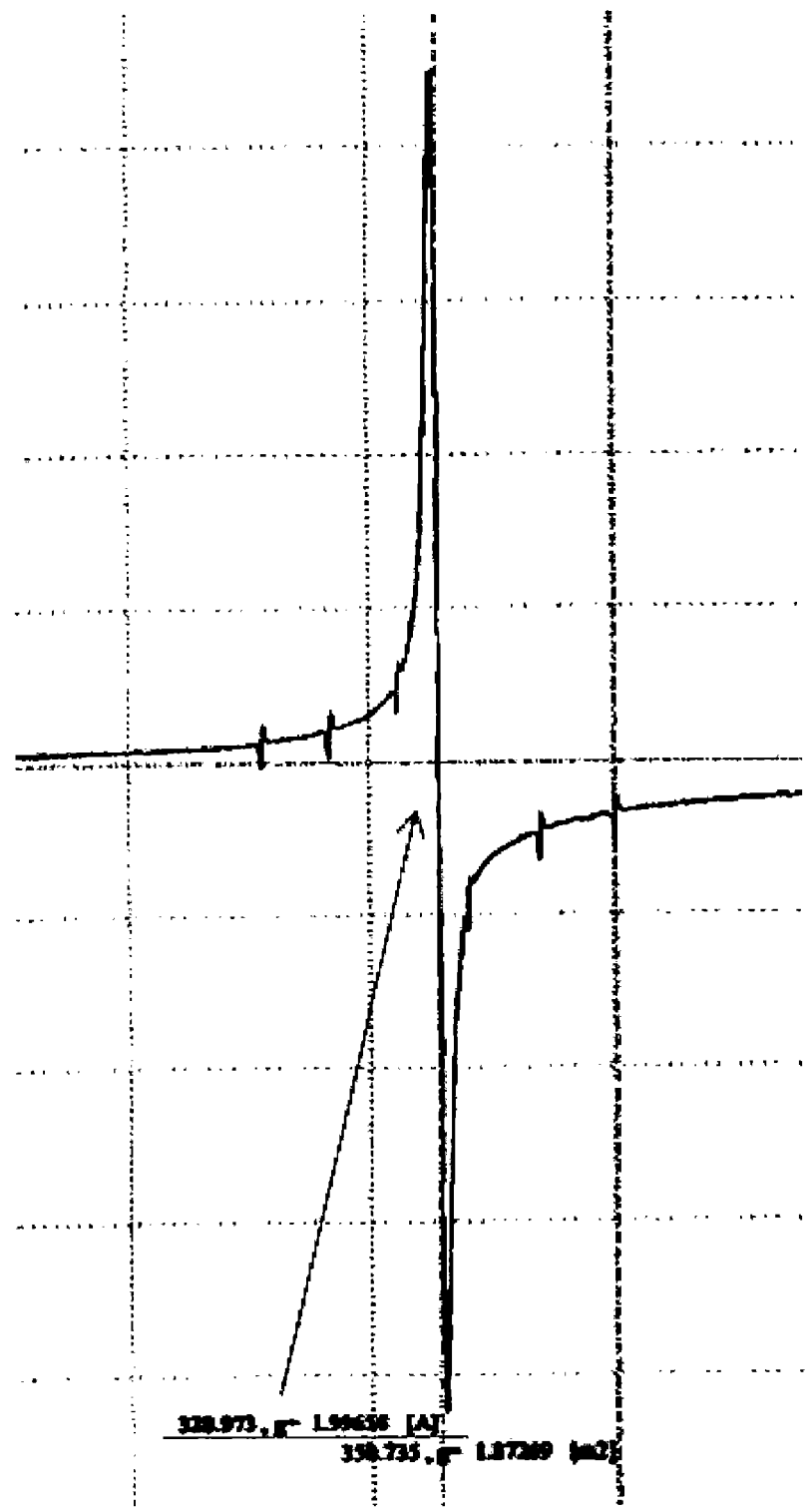

FIG. 5.1
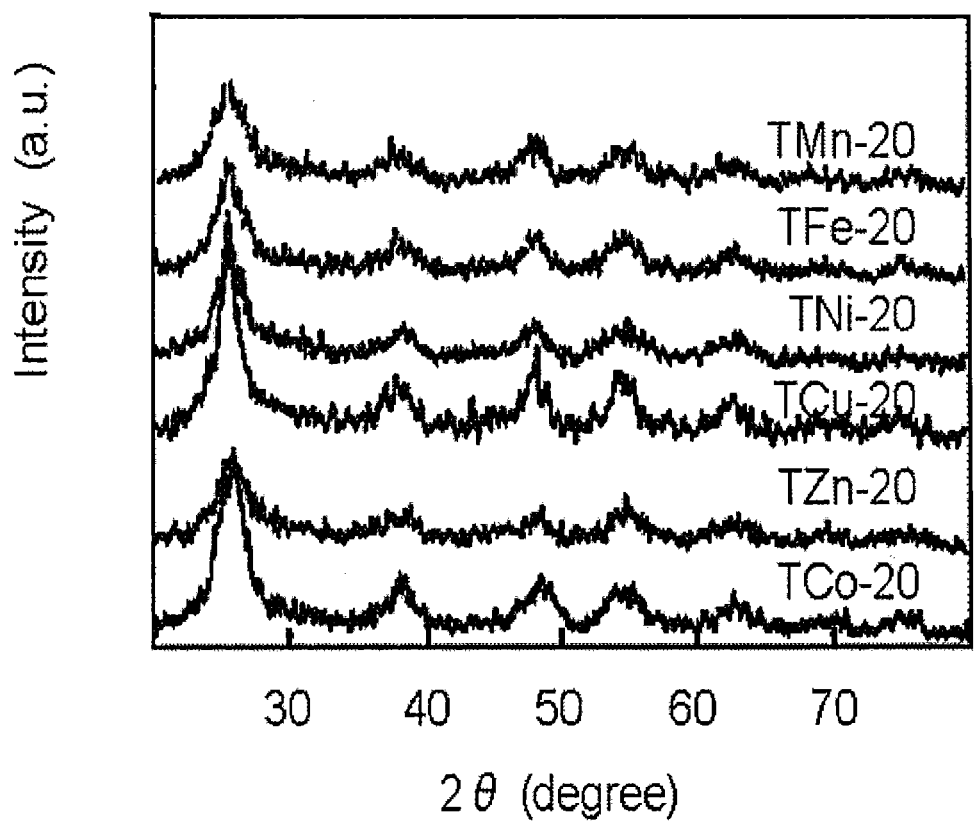

FIG. 5.2
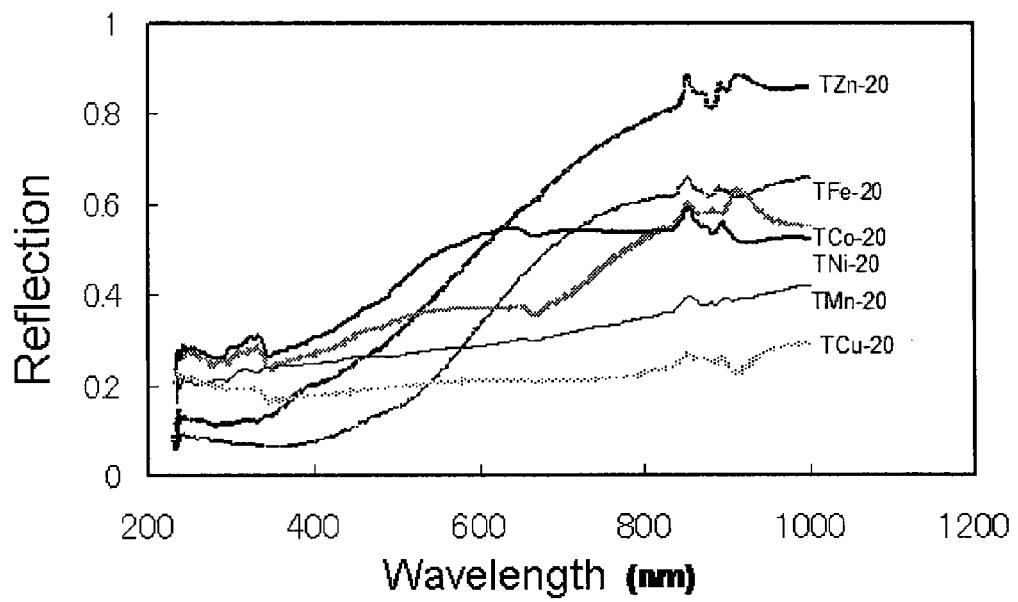
FIG. 6.1
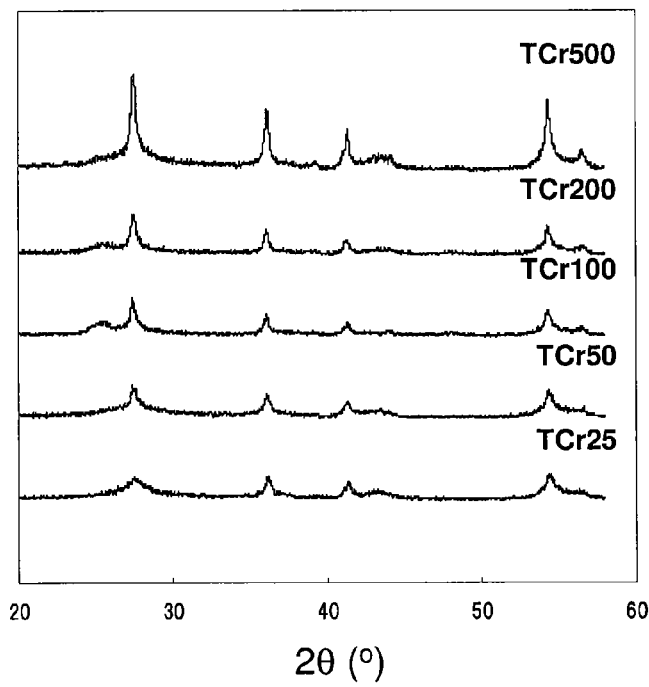

FIG. 6.2
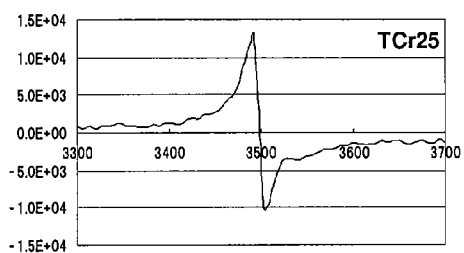
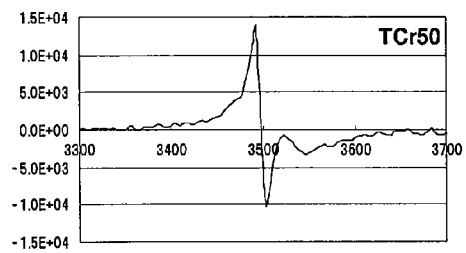
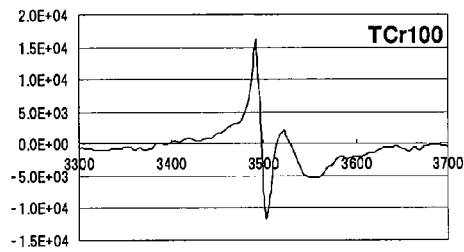
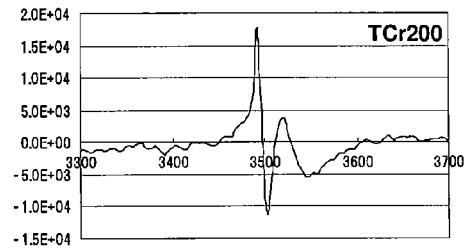

FIG. 6.3
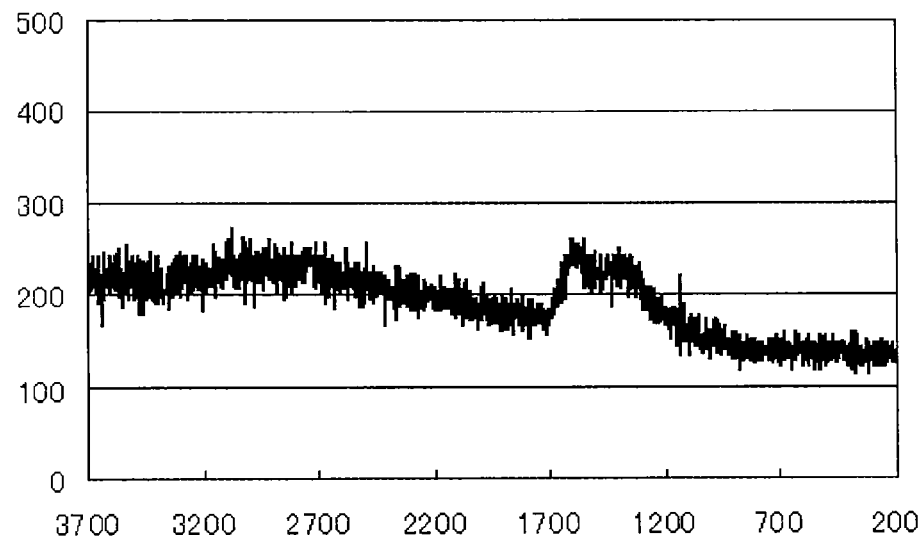
FIG. 7.1
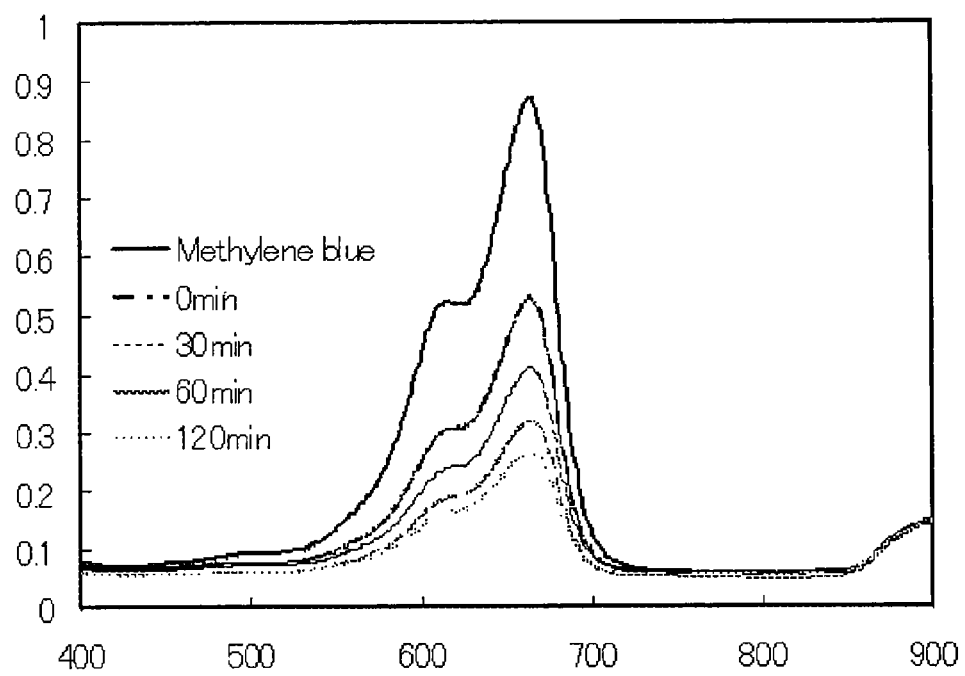

FIG. 7.2
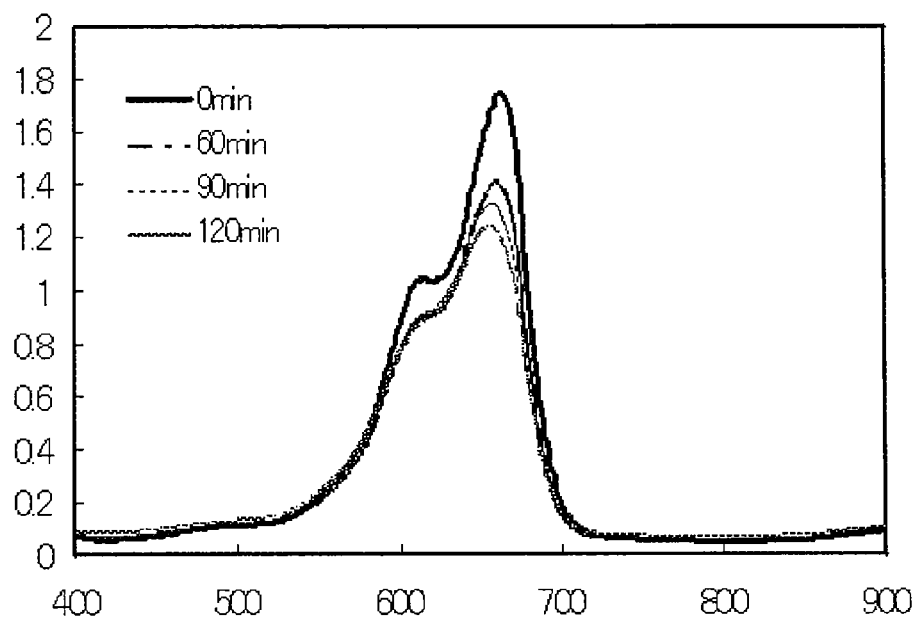
FIG. 7.3
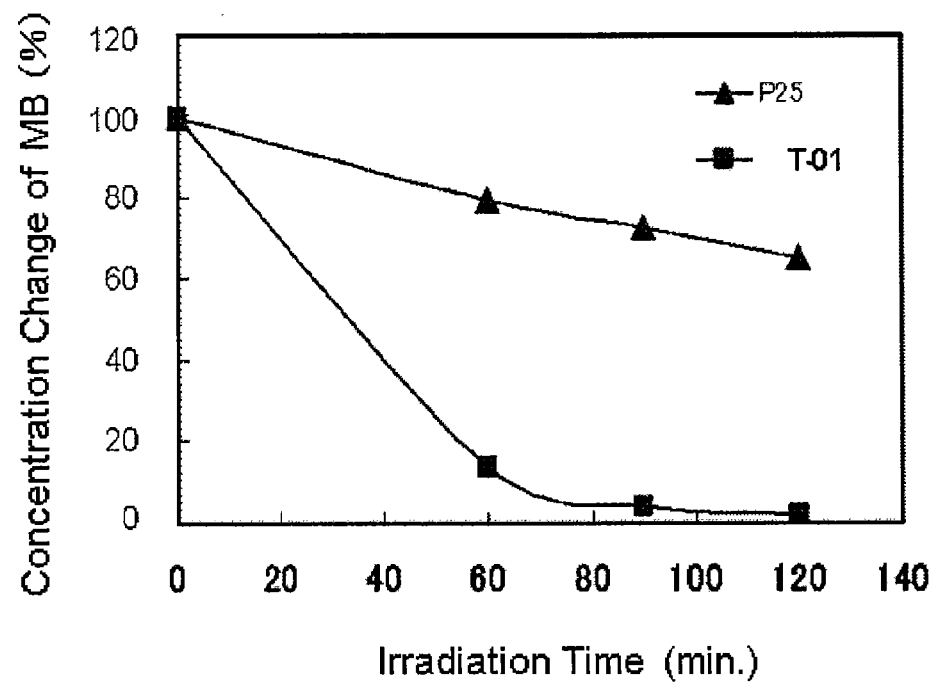

FIG. 7.4
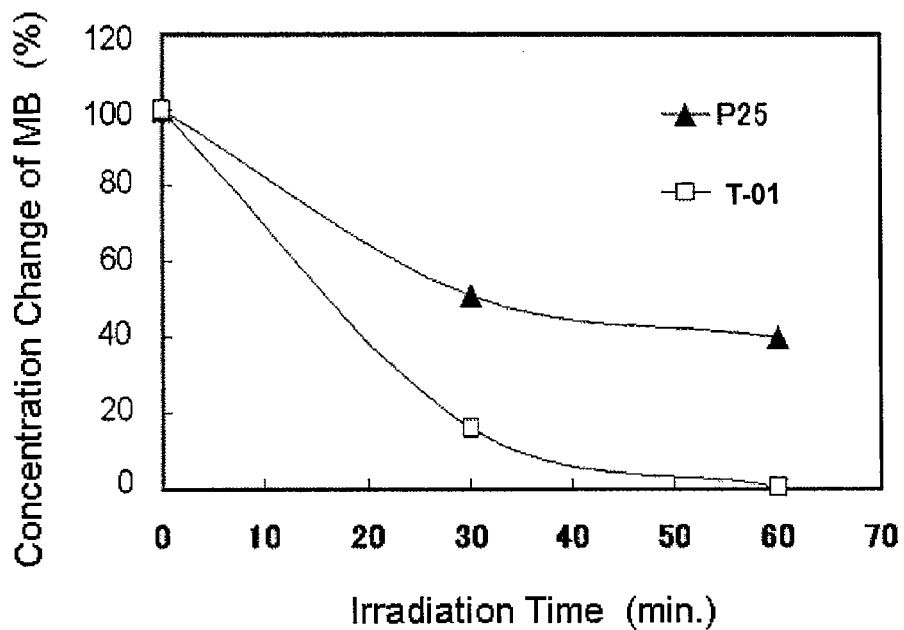
FIG. 8.1
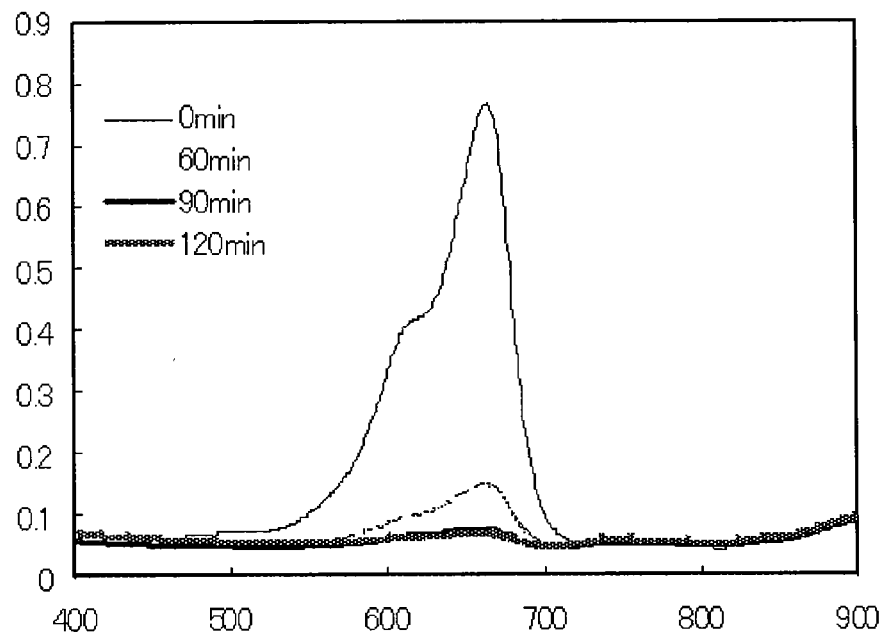

FIG. 8.2
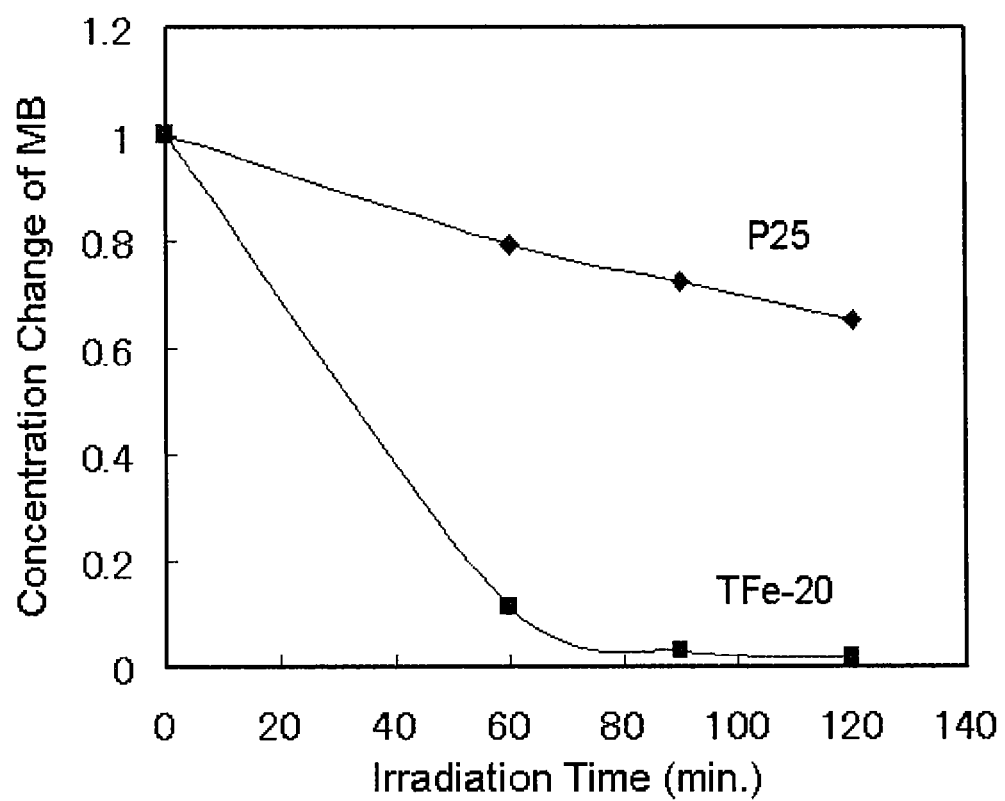

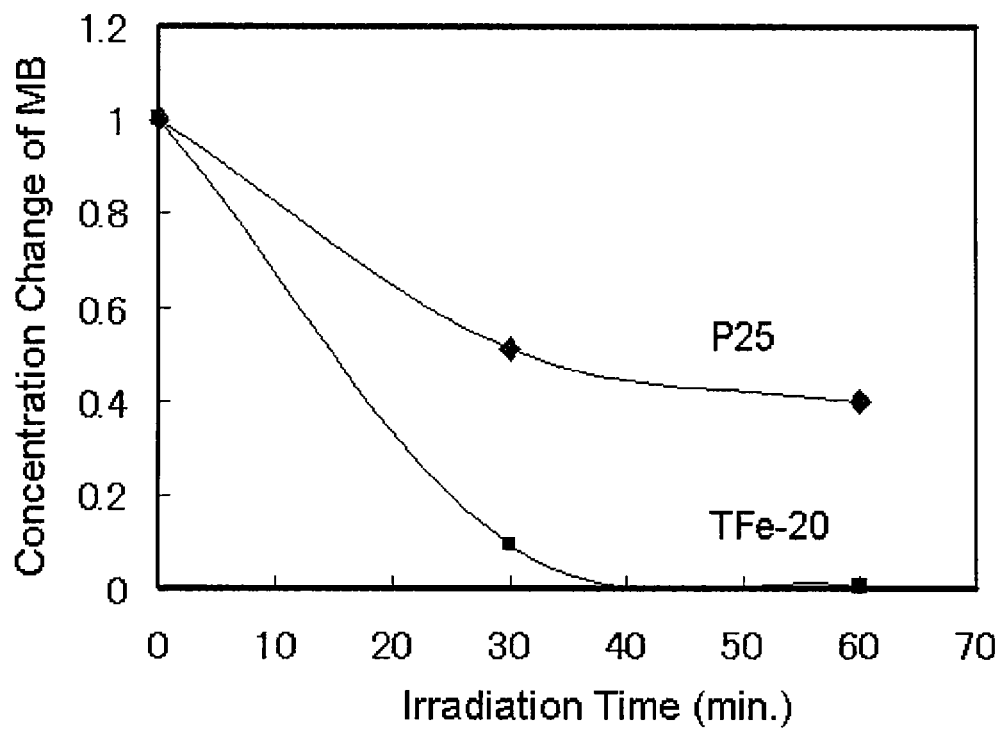
FIG. 8.3

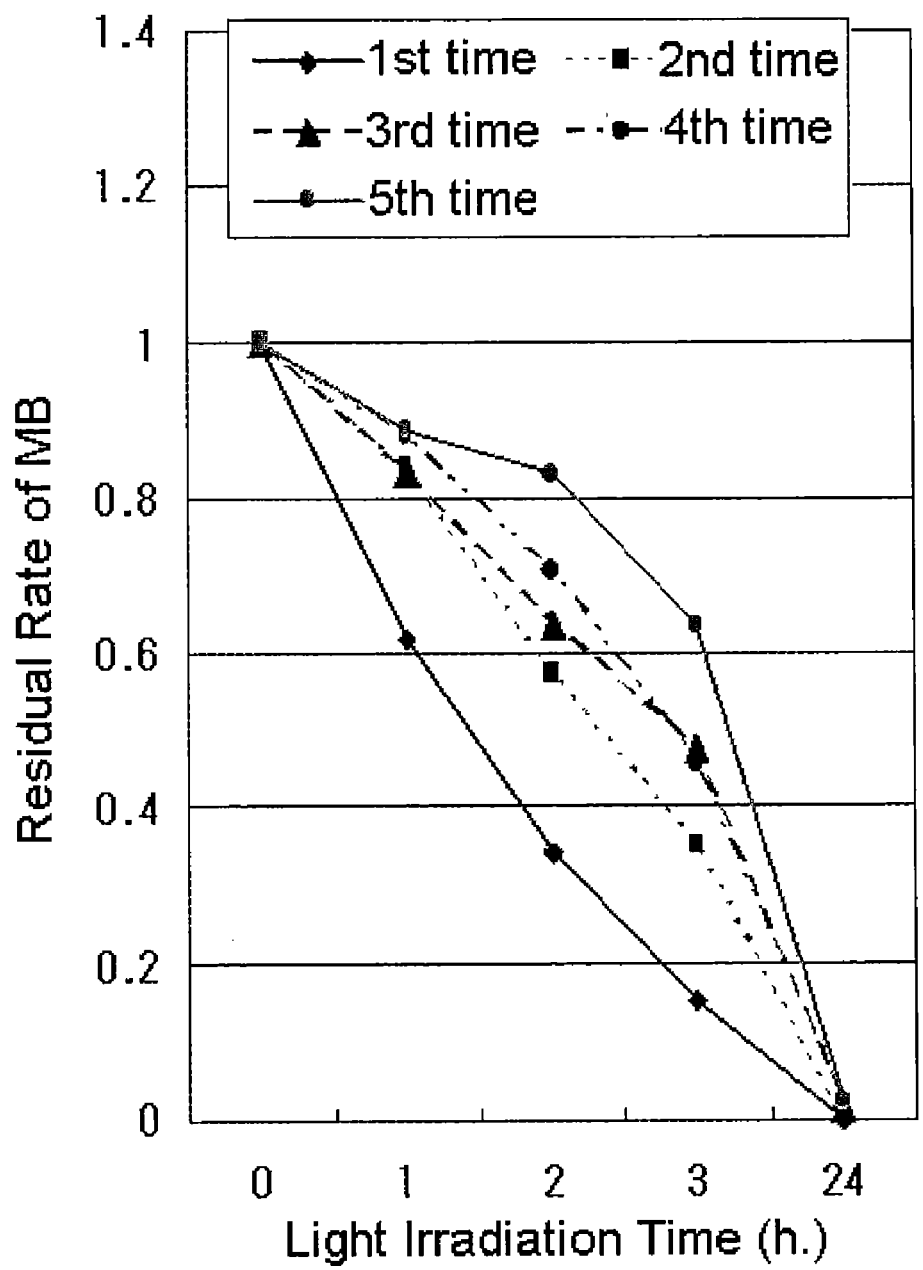
FIG. 9.1

US 8,017,542 B2

METHOD FOR PRODUCTION OF DOPED TITANIUM OXIDE, DOPED TITANIUM OXIDE, AND VISIBLE LIGHT-RESPONSIVE PHOTOCATALYST COMPRISING THE DOPED TITANIUM OXIDE

CROSS-REFERENCE TO PRIOR APPLICATION

This is the U.S. National Phase Application under 35 U.S.C. §371 of International Patent Application No. PCT/JP2007/073773 filed Dec. 10, 2007, which claims the benefit of Japanese Patent Application No. 2006-335659 filed Dec. 13, 2006, both of them are incorporated by reference herein. The International Application was published in Japanese on Jun. 19, 2008 as WO2008/072595 A1 under pct article 21(2).

TECHNICAL FIELD

The present invention relates to a visible light-responsive photocatalyst, a doped titanium oxide doped with carbon atoms and so on, which is useful as a semiconductor for solar cell and a catalyst for fuel cell, producing method thereof, and a visible light-responsive photocatalyst using the doped titanium oxide.

BACKGROUND ART

Among advanced materials, titanium oxide gets attention increasingly because it shows applied properties unlike conventional white pigment and materials having high refractive indices (for example, refer to non-patent document No. 1). For example, in photocatalyst or separating function of electron charge of pigment sensitization, titanium oxide is an outstanding catalyst material, and has a big hope for applied field of device for a next-generation photocatalyst and a solar cell. Also in fuel cell which gains considerable attention in energy problems, research and developments of electrode layers in which platinum nano-particles are buried in titanium oxide is in the limelight. Hydrogen production is required for practical implementation of a fuel cell, and among catalysts for hydrogen production, a composite of titanium oxide and platinum is an effective candidate.

Recently, in titanium oxide, photocatalytic function which decomposes spontaneously stain and harmful materials, etc., and makes them harmless, gets attention extremely. The applied field spreads to housing, automobiles, medical treatment, soil treatment, etc., and the photocatalytic function is ranked as an indispensable technique for constructing a recycling-oriented society. However, in order to make reveal the photocatalytic function of titanium oxide, it is a precondition to use ultraviolet ray as a light source. Taking into account that natural light (sunray) contains only ultraviolet of about 3% and most of the light is visible light, use of sunray with photocatalyst which absorbs ultraviolet only becomes almost meaningless. That is, in order to use titanium oxide as an effective photocatalyst, it is most important to convert bounds for absorption of titanium oxide itself to visible light. Therefore, in many researches, atomic doping into titanium oxide which may be said as impurities, for example, anion (nitrogen atoms, carbon atoms, sulfur atoms, phosphorous atoms) doping, or cation (metal ions such as transition metals, rare earth metals, semimetals and so on) doping have been investigated.

Several typical methods is known for doping to titanium oxide. For example, in case of preparing titanium oxide by a sol-gel reaction of titanium oxide compounds, such method is cited in which metal ion compounds are added simultaneously and colored titanium oxide is produced by burning obtained hydrolysate with heat (for example, refer to non-patent documents from No. 2 to No. 4). As such method is the most simple sol-gel reaction, the method has been used easily by many researchers, however, different results are apt to be obtained on experimental conditions, and so it is recognized that reproducibility is almost never assured. Namely, a production method of mixing metal ion compounds with simple sol-gel reaction, high-grade reaction of doping is impossible to control. Also, it is impossible to analyze what kind of material is obtained (a percentage of a constituent, a location position, kinds of different doped atoms). Therefore, the photocatalytic reaction was not reproducible, and the method was hardly to be said to be a production method of doped titanium oxide utilized for industrial use.

In order to escape from the situation, to use ion-implantation method by acceleration voltage is developed (for example, refer to patent document No. 1). In the patent document No. 1, metal ions are doped to a crystal plane of titanium oxide with implanting metal ions to crystal plane with accelerated energy. The method is certainly effective as the method of controlling doping reaction with fitting purposes because the method is capable of controlling the quantity and kinds of implanting ions. Moreover, it is confirmed that the titanium oxide obtained by the method shows absorption in the visible light region from 400 to 500 nm, and that the titanium oxide obtained by the method functions as visible light-responsive photocatalyst.

Also, doping with atoms which have comparatively high impurity level such as iron and aluminum in crystal lattice of titanium oxide, by using ultrahigh-temperature gas plasma method (for example, refer to patent document No. 2). However, the production cost of the ion-implantation method with accelerated energy, and the ultrahigh-temperature gas plasma method is high with the process themselves, and it is not too much to say that both methods are absolutely unsuitable for supplying visible light-responsive photocatalyst to a recycling-oriented society.

Also, titanium oxide doped with nitrogen atoms gets many attentions for several years as having visible light-responsive photocatalyst function. For example, production of yellow-colored titanium oxide powder is proposed by titration of ammonia water into hydrolytic reaction of titanium tetrachloride, then burning with heat the obtained hydrolysate (for example, refer to patent document No. 3). In the patent document No. 3, it is described that a signal which is considered to be derived from radical, under irradiation of visible light, in a spectrum of electron-spin resonance (hereinafter, written for short as ESR) measured at room temperature, is observed with g value between 1.930 and 2.030.

In addition, it is also reported that a visible light-responsive photocatalyst containing titanium oxide doped with carbon atoms is obtained by hydrolyzing titanium tetrachloride in the presence of tetrabutyl ammonium hydroxide, then by treating the obtained precipitate with heat (for example, refer to non-patent document No. 5).

Still more, it is also reported that a signal with g value of 2.03 which is a photocatalyst having carbonic precipitate on the surface of titanium oxide and is attributed to the carbonic precipitate or sodium in no presence of light, in ESR spectrum measured at room temperature (for example, refer to patent document No. 4).

However, because titanium oxide obtained in the patent document No. 3 and in the non-patent document No. 5 has yellow color, so it can only utilize effectively visible light of at most 600 nm though it states visible light-responsive, and the function as visible light-responsive photocatalyst is low. Moreover, when the measurement of ESR is performed in the darkness, the signal is not substantially observed. Therefore, the application had its limitation where sufficient visible light could not be obtained. Also, the production method of titanium oxide proposed in the non-patent document No. 5 is a method of burning precipitate which is produced from a mixed system of strong basic compounds like quarternary hydroxyl ammonium and titanium tetrachloride. There is no essential difference between the method and the conventional burning method with heat of a precipitate produced from a sol-gel reaction of alkoxytitanium, and the reproducibility is poor as described above. In addition, detailed investigation into the bond state concerning doped carbon atoms is not performed. Namely, structural analysis of doped titanium oxide is not performed, and it is discussed that the photocatalytic function of visible light depending on a percentage of carbon is only paid attention. Also, with a photocatalyst proposed in the patent document No. 4, a peak derived from sodium is observed which is not used clearly as source material, and also the quantity of existence is measured, so it is difficult to say that the structure of the obtained titanium oxide is controlled. The production method is based on the above-described plasma method, so in view of looking at the production method from the point of view of reproducibility, industrial production method, the method cannot be expected to practically use.

The structure and properties of industrially useful titanium oxide as visible light-responsive photocatalyst are not yet sufficiently specified, various parameters are used by researchers, and are not standardized. Therefore, a production method of doped titanium oxide which is both reproducible and simple, establishment of an identification method (analytical means) with the structure of doped titanium oxide, furthermore connection of the structure of obtained doped titanium oxide with the function as photocatalyst, etc. are the most important technical problem at present.

PRIOR ART LITERATURE

Non-Patent Literature

Non-Patent Document No. 1:
A. L. Linsebiger et al., Chem. Rev., 1995, Vol. 95, p. 735
Non-Patent Document No. 2:
E. Borgarello et al., J. Am. Chem. Soc., 1982, Vol. 104, p. 2996
Non-Patent Document No. 3:
L. Zang et al., J. Phys. Chem. B 1998, Vol. 102, p. 10765
Non-Patent Document No. 4:
H. Kisch et al., Angew. Chem. Int. Ed., 1998, Vol. 37, p. 3034
Non-Patent Document No. 5:
S. Sakthivel et al., Angew. Chem. Int. Ed., 2003, Vol. 42, p. 4908

Patent Literature

Patent Document No. 1: Japanese Unexamined Patent Publication Application No. H09-262482
Patent Document No. 2: Japanese Unexamined Patent Publication Application No. 2003-300730
Patent Document No. 3: Japanese Unexamined Patent Publication Application No. 2001-190953
Patent Document No. 4: Japanese Unexamined Patent Publication Application No. H11-333304

SUMMARY OF THE INVENTION

Problems to be Solved

In view of the actual situation, the problems to be solved by the present invention is to offer simply with industrially a production method of a doped titanium oxide effective carbon atoms and so on, a doped titanium oxide which shows strong absorbance from all visible light range to near infrared range of 2000 nm, which is excellent in photocatalytic function, and moreover which is specified with its structure and properties, and a visible light-responsive photocatalyst containing the doped titanium oxide.

Means for Solving the Problems

The inventors of this invention, as a result of intensive investigation in order to solve the problems, found that a titanium oxide is excellent in the function as photocatalyst wherein; an anatase crystalline or a rutile crystalline doped titanium oxide which is doped with carbon atoms, nitrogen atoms and metal ions consisting of crystals with the size from 5 to 20 nm, which resonance signal can be observed with g value in the range from 1.5 to 2.5 in electron spin resonance spectrum measured at a temperature between 20 and 30° C. in the darkness; also in nuclear magnetic resonance spectrum ($^{13}C$), a signal showing formation of $sp^2$ bond of carbon atoms can be observed; in Raman spectrum, a vibration wave number derived from amorphous carbon and graphite carbon can be observed in the range from 1200 to 1700 $cm^{-1}$ and the absorption is shown in the range from 400 to 2000 nm; and also found that a doped titanium oxide having the properties can be obtained easily and with good reproducibility by burning with heat a layered structure composite of polymer/titania obtained through hydrolytic reaction of water-soluble titanium compound in the presence of basic polymer having amino group(s), and they completed the present invention.

That is, the present invention provides a production method of a doped titanium oxide which is doped at least with carbon atoms and nitrogen atoms, the production method comprising the steps of;
(I) dispersing or dissolving basic polymer (x) having amino group(s) in aqueous medium,
(II) obtaining a layered structure composite of polymer/titania wherein basic polymer (x) having amino group(s) is inserted among titania by mixing aqueous dispersion or aqueous solution obtained in (I) and water-soluble titanium compound (z) in aqueous medium, and by producing a hydrolytic reaction at a temperature of 50° C. or less,
(III) being doped with carbon atoms and nitrogen atoms in basic polymer (x) having amino group(s) to the crystalline surface of titanium oxide by burning with heat the layered structure composite.

Further, the present invention also provides a production method of a doped titanium oxide which is doped at least with carbon atoms, nitrogen atoms and metal ions, the production method comprising the steps of;
(I) dispersing or dissolving complex (y) of basic polymer (x) having amino group(s) and metal ions in aqueous medium,
(II) obtaining a layered structure composite of polymer/titania wherein complex (y) of basic polymer (x) having amino group(s) and metal ions are inserted among titania by mixing aqueous dispersion or aqueous solution obtained in (I) and water-soluble titanium compound (z) in aqueous medium, and by producing hydrolytic reaction at a temperature of 50° C. or less,
(III) being doped with carbon atoms, nitrogen atoms and metal ions in complex (y) of basic polymer (x) having amino group(s) and metal ions, to the crystalline surface of titanium oxide by burning with heat the layered structure composite.

Furthermore, the present invention provides a doped titanium oxide which comprises anatase crystalline or rutile crystalline with a size from 5 to 20 nm having carbon atoms, nitrogen atoms, and metal ions; which electron spin resonance signal can be observed with g value in the range from 1.5 to 2.5 in the electron spin resonance spectrum measured at a temperature from 20 to 30° C. in the darkness; also in nuclear magnetic resonance spectrum ($^{13}$C), a signal showing formation of sp$^2$ bond with carbon atoms can be observed; moreover in Raman spectrum, vibration wave number derived from amorphous carbon and graphite carbon can be observed in the range from 1200 to 1700 cm$^{-1}$ and the absorption is shown in the range from 400 to 2000 nm; and provides visible light-responsive photocatalyst using it.

Effect of the Invention

The structure of a doped titanium oxide of the present invention can be identified by various analyzing methods. It is clear that a titanium oxide identified by the methods has excellent function as photocatalyst. Therefore, a doped titanium oxide of high industrial usefulness (reliability) can be provided.

In addition, the production method of the present invention has a process in which compounds containing doped atoms or ions are inserted beforehand between nano-crystals of titania at a nano-space distance (a process for obtaining a composite having layered structure). Therefore, by burning the obtained composite with heat, atoms or ions confined to the nano-space can be effectively doped to a titanium oxide. The method is not limited to with a single kind of atom, but can be doped with plural kinds of atoms simultaneously, so a doped titanium oxide having a wide bounds for absorption from visible light to near infrared region can be obtained. So, a doped titanium oxide obtained by the production method of the present invention has quite high usefulness in respect to effective use of natural light (sunray). Here, by adjusting the selection of raw materials and the use rate of the composite layered structure which is a precursor, it is possible to synthesize a doped titanium selectively which absorbs light in the range for the purpose. Therefore, in respect to be able to adjust according to the applied field and use circumstances of a doped titanium oxide, it is clear that the production method of the present invention exceeds the conventional technology.

Moreover, by using a doped titanium oxide of the present invention in combination with various kinds of materials, it can be used also as a solar cell parts, hydrogen generating catalyst, fuel cell parts of hydrogen or alcoholic source system. In addition, use of various fields such as a bacteria preventive agent, a bactericide, an anti-virus, cosmetics, etc. is possible. Furthermore, because a doped titanium oxide of the present invention shows absorption also in near infrared region, it can be applied to uses of an electronic material, an electrical conducting material, a thermoelectric material and so on.

In particular, since a visible light-responsive photocatalyst of the present invention contains a doped titanium oxide of high light-responsiveness of the present invention, it has high usefulness in respect to be able to make reveal the effect, even at a place where the light in the region from ultraviolet to near infrared does not reach sufficiently.

BRIEF DESCRIPTION OF THE DRAWINGS

FIG. 1.1 is a measured XRD result of a layered composite (P1) obtained in synthesizing example 1.

FIG. 1.2 is a measured Raman spectroscopic result of a layered composite (P1) obtained in synthesizing example 1.

FIG. 1.3 is a measured $^{13}$C-NMR result of a layered composite (P1) obtained in synthesizing example 1 (upper Figure).

FIG. 2.1 is a measured XRD result of a layered composite (PFe-20) obtained in synthesizing example 2.

FIG. 2.2 is a measured Raman spectroscopic result of a layered composite (PFe-20) obtained in synthesizing example 2.

FIG. 2.3 is a measured $^{13}$C-NMR result of a layered composite (P Fe-20) obtained in synthesizing example 2.

FIG. 3.1 is a photograph of high resolution transmission electron microscope (TEM) of a doped titanium oxide (T-01) obtained in example 1.

FIG. 3.2 is a measured XRD result of a doped titanium oxide (T-01) obtained in example 1.

FIG. 3.3 is a UV-Vis reflection spectrum of a doped titanium oxide (T-01) obtained in example 1.

FIG. 3.4 is a measured $^{13}$C-NMR result of a doped titanium oxide (T-01) obtained in example 1 (lower Figure).

FIG. 3.5 is a thermogravimetric analytical chart of a doped titanium oxide (T-01) obtained in example 1.

FIG. 3.6 is an ESR spectrum of a doped titanium oxide (T-01) obtained in example 1.

FIG. 4.1 is a photograph of high resolution transmission electron microscope (TEM) of a doped titanium oxide (TFe-20) obtained in example 2.

FIG. 4.2 is measured XRD results of doped titanium oxides (TFe-20, TFe-50, TFe-100, TFe-200) obtained in example 2.

FIG. 4.3 is UV-Vis reflection spectrums of doped titanium oxide (TFe-20, TFe-50, TFe-100, TFe-200) obtained in example 2.

FIG. 4.4 is a measured $^{13}$C-NMR result of a doped titanium oxide (TFe-20) obtained in example 2.

FIG. 4.5 is a thermogravimetric analytical chart of a doped titanium oxide (TFe-20) obtained in example 2.

FIG. 4.6 is an ESR spectrum of a doped titanium oxide (TFe-20) obtained in example 2.

FIG. 5.1 is measured XRD results of doped titanium oxides (TZn-20, TMn-20, TCu-20, TCo-20, TNi-20) obtained in example 3.

FIG. 5.2 is UV-Vis reflection spectrums of doped titanium oxides (TZn-20, TMn-20, TCu-20, TCo-20, TNi-2) obtained in example 3.

FIG. 6.1 is measured XRD results of doped titanium oxides (TCr-25, TCr-50, TCr-100, TCr-200, TCr-500) obtained in example 4.

FIG. 6.2 is ESR spectrums of doped titanium oxides (TCr-25, TCr-50, TCr-100, TCr-200) obtained in example 4.

FIG. 6.3 is measured Raman spectroscopic results of doped titanium oxides (TCr-25, TCr-50, TCr-100, TCr-200, TCr-500) obtained in example 4.

FIG. 7.1 is an absorption spectrum in examination example 1 (Decolorization reaction of methylene blue using a doped titanium oxide T-01 under irradiation of visible light).

FIG. 7.2 is an absorption spectrum in comparative examination example 1 (Decolorization reaction of methylene blue using AEROXIDE P25 under irradiation of visible light).

FIG. 7.3 are graphs showing concentration changes of reaction solutions in an examination example 1 and a comparative examination example 1.

FIG. 7.4 are graphs showing concentration changes of reaction solutions using natural light simulator in an examination example 1 and a comparative examination example 1.

FIG. 8.1 is an absorption spectrum in an examination example 2 (Decolorization reaction of methylene blue using a doped titanium oxide TFe-20 under irradiation of visible light).

FIG. 8.2 are graphs showing concentration changes of reaction solution in an examination example 2 and a comparative examination example 1.

FIG. 8.3 are graphs showing concentration changes of reaction solution using natural light simulator in an examination example 2 and a comparative examination example 1.

FIG. 9.1 are graphs showing concentration changes of methylene blue reaction solution versus irradiation time, when using catalyst repeatedly in an examination example 3 under irradiation of visible light.

DESCRIPTION OF THE PREFERRED EMBODIMENTS

A doped titanium oxide of the present invention comprises crystals of anatase crystalline or rutile crystalline titanium oxide having at least carbon atoms, nitrogen atoms and metal ions with the size from 5 to 20 nm, which resonance signal can be observed with g value in the range from 1.5 to 2.5 in the electron spin resonance spectrum measured at a temperature from 20 to 30° C. in the darkness; also in nuclear magnetic resonance spectrum ($^{13}C$), signal showing the formation of $sp^2$ bond of carbon atoms; in Raman spectrum, vibration wave numbers derived from amorphous carbons and graphite carbons can be observed in the range from 1200 to 1700 $cm^{-1}$ and the absorption shows in the range from 400 to 2000 nm; further, it has excellent light-responsiveness in the range from visible light to near infrared.

A doped titanium oxide of the present invention shows absorption in the range from 400 to 2000 nm, however, it has also ultraviolet absorption function which usual titanium oxide has. A doped titanium oxide which has absorption of whole wave lengths in the range from 400 to 2000 nm, is excellent in respect to effective use of natural light (sunray). However, a doped titanium oxide is preferable which absorbs only a specified wave length range from visible light to near infrared, according to use or use circumstances, and it is possible to use a doped titanium oxide differently for different required functions for the doped titanium oxide.

Until now, it is widely known that, by doping with various different kinds of atoms to titanium oxide, visible light-responsiveness can be acquired. However, distinct signal based on conduction electrons of titanium oxide can not be observed in ESR spectrum in the darkness and at room temperatures (from 20 to 30° C.). ESR spectrum is observed with phenomena caused by transition among adjacent energy levels of unpaired electrons existing in a measured sample (compound) through the absorption state of electromagnetic energy. Therefore, the reason why signal can not be observed is considered to have been attributed to the difficulty of holding stable unpaired electrons in titanium atoms of a doped titanium oxide. ESR of a doped titanium oxide is measured at extremely low temperatures (about from 77K to 173K) in order to make the transition velocity between energy levels slow to the degree to be able to observe, moreover, in order to give energy to bring about unpaired electrons, ESR of a doped titanium oxide is limited to the measurement of irradiation of light with the wave length which the doped titanium oxide is possible to absorb. Therefore, it is a common knowledge to persons skilled in the art that, in ESR measurement of titanium oxide at room temperature in the darkness, no peak is substantially observed. Actually, peaks observed at room temperature in no presence of light in the patent document No. 4, are considered to be derived from precipitates of carbon system or electrons of sodium which cover a part of surfaces of titanium oxide. A peak with g value of 1.97 which is a signal attributed to conduction electrons in the materials which are considered to have photocatalytic function, is not observed at room temperature, but is observed only at a temperature of liquid nitrogen. Therefore, as in a doped titanium oxide of the present invention distinct signals can be observed at room temperature in the darkness, a doped titanium oxide of the present invention differs completely from the titanium oxide proposed until now, and it is considered to be a factor of properties of excellent photocatalytic function and so on.

In addition, signals of a doped titanium oxide of the present invention can be observed showing the formation of $sp^2$ bond with carbon atoms in nuclear magnetic resonance spectrum ($^{13}C$); and in Raman spectrum, vibration wave numbers derived from amorphous carbon and graphite carbon can be observed in the range from 1200 to 1700 $cm^{-1}$. Because such carbon atoms are contained in the doped titanium oxide, it is considered that various visible light- and/or near infrared-responsive function of light-responsiveness function, etc. can be revealed effectively.

Doped substances to the doped titanium oxide of the present invention are at least carbon atoms, nitrogen atoms and metal atoms. On this occasion, substances of a single kind of metal ion, or of two or more kinds of metal ions may be doped. They may be selected variously according to use and use circumstances of the doped titanium oxide, and they may be used singly or mixedly.

Further, other nonmetallic atoms can be contained in a doped titanium oxide of the present invention. As for other nonmetallic atoms, sulfur atoms and phosphorous atoms are preferable because these atoms can further increase the catalytic function higher of the obtained doped titanium oxide. As for other nonmetallic atoms, a single kind of atom or two or more kinds of atoms may be doped. Particularly, a doped titanium oxide doped with two or more kinds of nonmetallic atoms has large absorption in the wide range from visible light to near infrared, so it is preferable because of increase in visible light-responsiveness.

As for doped ratio of carbon atoms, nitrogen atoms and other nonmetallic atoms used according to necessity, in respect to excellent visible light-responsiveness of the obtained doped titanium oxide and no damage of crystal structure of the titanium oxide, it is preferable that the sum of carbon atoms and nitrogen atoms compared with total amount of doped titanium oxide is 20 mass % or less, in particular, more preferable 10 mass % or less. In case of containing other nonmetallic atoms further, the sum of carbon atoms, nitrogen atoms and other nonmetallic atoms is preferable 20 mass % or less compared with the total amount of doped titanium.

As for the metal ions, they may be not limited particularly, and a doped titanium oxide can be doped with various ions such as alkaline earth metals, transition metals, semimetals, lanthanide metals, etc.; which may contain only a single metal ion, or may contain two or more kinds of metal ions. In particular, a titanium oxide doped with two or more kinds of metal ions is preferable because it has large absorption in the wide range from visible light to near infrared, and increases in visible light-responsiveness. Among these, ions of transition metals, for example, ions of iron, manganese, nickel, cobalt, copper, vanadium, zinc, platinum, silver and palladium are, in the production method of a doped titanium oxide of the present invention described below, preferable in respect to be able to be doped to the titanium oxide easily and excellent in visible light-responsiveness of the obtained doped titanium oxide.

As for the doped ratio of the metal ions, in view of excellent visible light-responsiveness of the obtained doped titanium oxide, and of no damage of crystal structure of titanium oxide, 10 mass % or less is preferable compared with the total amount of doped titanium oxide.

A doped titanium oxide of the present invention comprises anatase crystalline or rutile crystalline crystals with size of 5 to 20 nm. As to size and kinds of crystals, they can be made distinct by observation of high resolution transmission electron microscope (TEM), or by of X-ray crystal structure diffraction (XRD) analysis. Particularly, from results of XRD analysis, scattering patterns differ from crystal kinds of anatase crystalline, rutile crystalline, so it is easy to analyze, besides the crystal size can be calculated from the half-width. Particularly those having anatase crystalline is preferable because of excellent photocatalytic function.

A doped titanium oxide of the present invention has the above-mentioned structure and properties (spectrum), and having such structure and properties reveals effectively the function in the use of visible light-responsive photocatalyst and so on. There is no particular limitation for obtaining such doped titanium oxide. However, in view of easy industrial production, good reproducibility, adjustability of introducing amount and kinds, etc. of doped carbon atoms, nitrogen atoms, metal ions, the production method of the present invention; that is, burning with heat a layered structure composite of polymer/titania formed by hydrolytic reaction of water-soluble titanium compound in the presence of basic polymer having amino group(s) is the most preferable method.

Production methods of the present invention is described below in detail.

The production method of a doped titanium oxide of the present invention is, using layered a composite of polymer or polymer-metal complex and titania nano-crystal holding interlayer distance of the order of nanometer, preferably from 1 to 3 nm, as precursor, and by burning it with heat, and the precursor is transformed to a titanium oxide doped with impurities. Such production method makes it possible to control the crystal size to about 10 nm.

Nano-structure like nano-crystals, nano-space, in addition to the function of the structure itself, as new nano-reaction field, has many possibilities for synthesizing new functional materials. Particularly, when nano layered structure, which confines the substance of the second component between the layers of the semiconductor crystals with nano-distance, is formed, by the various kinds of treatments, chemical reactions can be induced between the crystal surfaces of semiconductor and substances existing in the layers. Namely, layered nano-space can become an extremely advantageous nano-reaction field. The present invention was paid attention to such viewpoint, and an optimal process comprising two step ways of synthesizing substance of precursor for doping at nano-reaction field and burning the substance with heat was devised.

Here, the important is structuring a nano layered composite at the first step. It is known that many of inorganic oxides in bioactive system make biopolymers as templates, for example, an organization (associated object) of basic polypeptide, protein or polyamine, form a composite having complicated and fine patterns containing such biopolymers, or construct layered structure arranged with inorganic layers and organic layers alternately in the composite. The present invention imitates such process of living things, by using basic polymer (x) having amino group(s), or complex (y) of basic polymer (x) having amino group(s) and metal ions as templates, and by producing hydrolysis and condensation reaction of water-soluble titanium compound (z) in its presence, obtained a layered structure composite of polymer/titania in which basic polymer (x) having amino group(s), or complex (y) of basic polymer (x) having amino group(s) and metal ions is inserted among titania, and is completed.

Basic polymer (x) having amino group(s), or complex (y) of basic polymer (x) and metal ions functions as a catalyst of hydrolytic condensation reaction of water-soluble titanium compound (z). At the same time, forming ion complex with titania sol produced by the reaction, the basic polymer (x) or the complex (y) derives deposit of the titania sol. As the result, a layered structure composite of polymer/titania in which the polymer and the titania laminate alternately is produced.

By burning with heat the polymer/titania composite organized to the layered structure, carbon atoms, nitrogen atoms, metal ions in basic polymer (x) having amino group(s) contained among titania crystal layers, or in complex (y) of basic polymer (x) having amino group(s) and metal ions, induce doping reaction at crystal surfaces of titania. By the reaction, carbon atoms, nitrogen atoms, metal ions are doped among the structure of the titania, this, as a result, transforms to a doped titanium oxide; which comprises anatase crystalline or rutile crystalline crystals with the size from 5 to 20 nm; which resonance signal measured at a temperature from 20 to 30° C. in the darkness can be observed with g value in the range from 1.5 to 2.5 in electron spin resonance spectrum; in nuclear magnetic resonance spectrum ($^{13}C$), signals which show $sp^2$ bond with carbon atoms can be observed; in Raman spectrum, vibration wave number derived from amorphous carbon and graphite carbon in the range from 1200 to 1700 $cm^{-1}$ can be observed, and absorption is shown in the range from 400 to 2000 nm.

A doped titanium oxide obtained by the production method contains carbon atoms and nitrogen atoms derived from basic polymer (x) having amino group(s). The percentage of carbon atoms constituent can be adjusted between 1 and 20 mass % in the doped titanium oxide. The adjustment is made by burning temperature, burning time, gas atmosphere during burning in the process of burning a composite of precursor with heat. The percentage of carbon atoms constituent, in case of fixing other conditions, becomes lower as the temperature becomes higher, but it does not change with presence of $sp^2$ bond of carbon atoms. Besides, under constant temperature, a percentage of carbon constituent increases under inert gas atmosphere, and a percentage of carbon constituent decreases under air atmosphere nearer. A general temperature of burning with heat is in the range from 300 to 1000° C., a doped titanium oxide having high visible light-responsiveness can be obtained. As for gas atmosphere during burning with heat, nitrogen gas, air, argon gas and mixed gas of these gases are cited, and it is particularly preferable to burn with heat under mixed gas atmosphere of nitrogen gas and air.

For example, a doped titanium oxide can be obtained, first by burning with heat a composite of a precursor under air atmosphere at 400° C. for predetermined time (10 to 60 minutes), after that by raising furnace temperature under nitrogen atmosphere to 600 to 1000° C., then by holding at the temperature under nitrogen atmosphere for predetermined time (10 to 180 minutes).

Moreover, for example, a doped titanium oxide can be obtained, after burning a composite of a precursor under nitrogen atmosphere at a temperature from 600 to 1000° C. for predetermined time (20 to 120 minutes), once again by burning under air atmosphere at a temperature from 350 to 450° C. for predetermined time (3 to 60 minutes).

In case of doping nonmetallic atoms other than carbon atoms and nitrogen atoms, for example, a method using mixture of acidic compound containing sulfur atoms (sulfur acid, toluene sulfonic acid, methyl sulfonic acid, ethyl sulfonic acid, etc.) and/or acidic compound containing phosphrous atoms (phosphrous acid, methyl sulfonic acid, ethyl sulfonic acid, phenyl sulfonic acid, etc.), and basic polymer (x) having amino group(s) is cited. In the presence of the mixture, by hydrolyzing water-soluble titanium compound, sulfuric acidic compound or phosphorous acidic compound bonded to amino group(s) of polymer is produced and it can be introduced to a layered structure. Or, a method of mixing a polymer/titania composite organized in layered structure in the solution of the acidic compound, then bonding the acidic compound to the polymer (x) may be preferable. By burning with heat a layered composite thus obtained, doping with nonmetallic atoms like sulfuric atoms or phosphrous atoms can be made easily. Also, doping can be made with using substances having nonmetallic atoms other than carbon atoms, nitrogen atoms in the structure of basic polymer (x) having amino group(s).

In addition, a percentage of metal ion constituent in doped titanium oxide obtained can be adjusted in the range from 0.2 to 5 mass %. The percentage of the constituent can be adjusted by a percentage of the metal ion constituent in the complex (y), at the stage of making a composite as precursor, by using complex (y) of basic polymer (x) having amino group(s) and metal ions. Namely, if a percentage of the constituent becomes higher, amount of doped metal ions can be increased, and if a percentage of the constituent becomes lower, amount of doped metal ions can be decreased. In addition, by using polymer complex having different metal ions together, plural kinds of metal ions can be doped to an obtained titanium oxide.

Hereinafter are described raw materials used in the production method of the present invention.

[Polymer (x)]

Basic polymer (x) having amino group(s) used in the present invention is not limited specially, but ordinary water-soluble polyamine can be used.

As for the polymer (x), for example, as an example of synthesized polyamine, synthesized polyamine such as polyvinylamine, polyallylamine, polyethyleneimine (branched and linear), polypropyleneimine, poly(4-vinylpyridine), poly(aminoethyl-methacrylate), poly[4-(N,N-dimethylaminomethylstyrene)] and so on, which contains amino group(s) as side chain or main chain, is cited. Above all, polyethyleneimine is preferable because it is easily available and is easy to form layered structure with titanium oxide sol.

Further, as for bioactive polyamines, for example, bioactive polyamines such as chitosan, spermidine, bis(3-aminopropyl)amine, homospermidine, spermine, etc.; or as biopolymers having many basic amino acid residue(s), bioactive polyamines, including synthetic polypeptide, for example, polylysine, polyhistidine, polyarginine, etc. are cited.

Furthermore, as for the polymer (x), it may be a modified polyamine in which a part of amino group(s) in the polyamine bonds non-amine polymerskeleton, or may be a copolymer of polyamineskeleton and non-amine polymerskeleton. The modified polyamine and the copolymer can be obtained easily by reacting amino group(s) of basic polymer (x) having amino group(s) with compounds which are capable of easily reaction with amine such as epoxy group(s), halogen(s), tosyl group(s), ester group(s) and so on.

The non-amine polymerskeleton may be either of hydrophilic or hydrophobic. As for hydrophilic polymerskeletons, for example, skeletons comprising polyethylene glycol, polymethyl oxazoline, polyethyl oxazoline, polyacrylamide, etc. may be cited. Also as for hydrophobic polymerskeletons, for example, skeletons comprising epoxy resin, urethane resin, polymethacrylate resin may be cited. In case of polymer (x) containing structural unit with no amino group(s), considering that the polymer (x) shows good dispersing state under the water, besides hydrolysis or dehydration condensation reaction of water-soluble titanium compound (z) described below is accelerated effectively, non-amine polymerskeleton is preferable to be 50 mass % or less compared with total structural unit of polymer (x), more preferable to be 20 mass % or less, and particularly preferable to be 10 mass % or less.

Still, as for molecular weight of the polymer (x), it should not be limited in particular, but the weight-average molecular weight as converted value with polystyrene measured by gel permeation chromatography (GPC) is usually in the range from 300 to 100,000, preferably in the range from 500 to 80,000, and more preferably in the range from 1,000 to 50,000.

(Complex (y) Comprising Polymer/Metal Ion)

Complex (y), used in the production method of the present invention, of basic polymer (x) having amino group(s) and metal ions is obtained by adding metal ions to basic polymer (x) having amino group(s), and forms complex (y) by coordinate bond of metal ions with amino group(s) in the polymer (x).

As for metal ions used here, all of the metal ions which are the same with metal ions in the purposive doped titanium oxide and which can bond coordinately with amino group(s), can be used. As for metal ionic valence number, it may be metal salts from univalent to quadrivalent, and also they are used preferably even if in the state of complexed ions.

As for the amount of metal ions used, $1/10$ to $1/200$ equivalent as ions is preferable compared with mol number of amino group in basic polymer (x) having amino group(s).

[Water-Soluble Titanium Compound (z)]

Water-soluble titanium compound used in the present invention is preferable non-halogenous titanium compound which is water-soluble, is not hydrolyzable in the solute state under water, that is to say, a stable non-halogenous titanium compound in the pure water. Concretely, for example, aqueous solution of titaniumbis(ammoniumlactate)dihydroxide, aqueous solution of titaniumbis(lactate), propanol/water mixed solution of titaniumbis(lactate), titanium(ethylacetoacetate)diisopropoxide are cited.

[Layered Structure Composite of Polymer/Titania]

A layered structure composite of polymer/titania can be obtained by mixing water-soluble titanium compound (z) in the aqueous solution of basic polymer (x) having amino group(s), or complex (y) of basic polymer (x) having amino group(s) and metal ions.

On this occasion, compared with the amine unit in basic polymer (x) having amino group(s), or in complex (y) of basic polymer (x) having amino group(s) and metal ions, an excess amount of water-soluble titanium compound (z) as titanium source can form a composite preferably. Concretely, a range of equivalent from 2 to 1000 times of water-soluble titanium compound compared with amine unit, particularly a range of equivalent from 4 to 700 times is preferable.

In addition, as for concentration of aqueous solution of basic polymer (x) having amino group(s), or complex (y) of basic polymer (x) having amino group(s) and metal ions, based on polyamine amount contained in the polymer (x), 0.1 to 30 mass % is preferable.

Hydrolytic condensation reaction time of water-soluble titanium compound (z) differs variously from 1 minute to several hours, and the reaction time is set more preferable from 30 minutes to 5 hours in order to raise reaction efficiency.

Further, pH-value of aqueous solution in the hydrolytic condensation reaction is preferable to be set between 5 and 11, and the value is particularly preferable between 7 and 10.

A composite (precursor) obtained by the hydrolytic condensation reaction is a white precipitate in the state having no metal ion, but a composite obtained in the presence of complex (y) of basic polymer (x) having amino group(s) and metal ions becomes colored precipitate reflected by metal ion color.

A percentage of a titania constituent in a composite (precursor) obtained by the hydrolytic condensation reaction is adjustable with reaction condition, etc., and these from 20 to 90 mass % of the whole composite can be obtained. Here, by burning with heat the obtained composite by the above-described method, a titanium oxide of the present invention can be obtained.

As for use of the doped titanium oxide of the present invention, it can be used in various uses where conventional titanium oxide is used. For, example, it can be used as parts for dye-sensitized solar cell, parts for solar cell without using dye-sensitization, hydrogen generating catalyst, cell parts with hydrogen system or alcoholic source system, also it can be used in various fields, such as a bacteria preventive agent, a bactericide, an anti-virus, cosmetics and so on. Furthermore, because a doped titanium oxide of the present invention shows absorption also in near infrared region, it can be applied to uses of an electronic material, an electrical conducting material, a thermoelectric material and so on. In particular, because the titanium oxide of the present invention can make reveal the effect even at a place where the light in the region from ultraviolet to near infrared does not reach sufficiently, as a visible light-responsive photocatalyst which decomposes spontaneously and make harmless stains and hazardous materials, a doped titanium oxide of the present invention can be used suitably in the field of housing, cars, medical, land treatment and so on.

In particular, when using as visible light-responsive photocatalyst, it has no limitation except for using a doped titanium oxide of the present invention, it may be used together with other photocatalyst, and it may contain various base materials and so on. Moreover, the shape when used as visible light-responsive photocatalyst is not restricted, for example, a doped titanium oxide of the present invention can be used as a shape of powder, particle, pellet, film, etc., and is preferable to select appropriately according to the circumstances to be used. Also, by mixing into coating agent and using, it is possible to make coating film having photocatalytic function.

Embodiment

Hereinafter, the present invention is explained with examples and reference examples concretely, but the present invention should not be limited to these. So far as not referred to particularly, "%" represents "mass %".

[Analysis by X-Ray Diffraction Method (XRD)]
An isolated and dried sample was mounted on holder for measuring sample, set to wide-angle X-ray diffraction apparatus "Rint-Ultma" made by Rigaku Corporation, and measured on conditions of Cu/Kα ray, 40 kV/30 mA, scan speed 1.0°/min., scan extent 0 to 40° (drying condition: at 25° C. for 24 hrs.)

[Analysis by Thermogravimetry (TG)/Differential Thermal Analysis (DTA)]
Weighed with powder measurement patch, set it to TG/DTA 6300 apparatus made by SII Nano Technology Inc., and measured at a rate of temperature increase of 10° C./min. with the temperature range from 20° C. to 800° C.

[Analysis by Raman Spectroscopy]
Raman spectrum of sample powder was measured with Raman-G99013 made by RENISHAW (UK).

[Shape Analysis by a Scanning Electron Microscope (SEM)]
An isolated and dried sample was mounted on a glass slide, and was observed by surface observing apparatus VE-8100 made by KEYENCE CORPORATION. (Drying condition: at 25° C. for 24 hrs.)

[Observation by a Transmission Electron Microscope (TEM)]
An isolated and dried sample was mounted on a copper grid vacuum evaporated with carbon, and it was observed by a transmission electron microscope JEM-2200FS made by Japan Electron Optics Laboratories. (Drying condition: at 25° C. for 24 hrs.)

[ESR Spectrum]
ESR spectrum was measured by electron spin resonance apparatus JEOL JES-FA200 (X-Band) (made by Japan Electron Optics Laboratories). Sample was crammed, in the state of powder condition as it was, into a tube for measuring, in the glove box for nitrogen substitution at room temperature under the condition of frequency=9193 MHz, Power=2.61 mW, modulation, Fq=100 kHz.

[UV-Vis Reflection Spectrum]
UV-Vis reflection spectrum was measured by spectrophotometer U-3500 made by Hitachi Ltd., by setting a sample on the integrating sphere.

[Decolorization Reaction of Methylene Blue Under a Fluorescent Lamp]
A state of progress of decolorization reaction was investigated by mixing a fixed amount of doped titanium oxide powder with a fixed amount of methylene blue aqueous solution (fixed concentration), irradiating light for a fixed time with light irradiation apparatus, taking out the supernatant of the reaction liquid, then measuring the change of absorbance with UV-Vis.

Constitution of irradiation apparatus of fluorescent light: Four fluorescent 8-watt lights were suspended in a prefabricated shading black box (the fluorescent lights were covered with tubular light filter, and lights of wave length equal to 420 nm or less were cut off), and the sample was set under it. The distance between the fluorescent lights and the sample is adjustable.

[Decolorization Reaction of Methylene Blue Under a Sunray Simulator Lamp]
A state of progress of decolorization reaction was investigated by mixing a fixed amount of doped titanium oxide powder with a fixed amount of methylene blue aqueous solution (fixed concentration), irradiating light for a fixed time with light irradiation apparatus, taking out the supernatant of the reaction liquid, then measuring the change of absorbance with UV-Vis.

Constitution of irradiation apparatus of sunray simulator: A sunray simulator lamp (made by SERIC LTD.) was fixed on the ceiling in a prefabricated shading black box, and the sample bottle was set under it. The distance between the lamp and the sample is adjustable.

Precursor Synthesizing Example 1

[A Layered Composite (P1) of Polyethyleneimine and Titania]
Water-soluble titanium compound ORGATIX TC-310 (titanium lactate made by Matsumoto Pharmaceutical Manufacture Co., Ltd.) was mixed with 25% aqueous ammonia to form a 28 volume % concentration (pH=9) aqueous TC-310 solution. With stirring, 2 wt % polyethyleneimine (product name: "EPOMINE SP-200", made by NIPPON SHOKUBAI CO., LTD.) aqueous solution of 20 ml was added dropwise into the 28 volume % concentration titanium aqueous solution of 20 ml under room temperature (25° C.). Stirring the mixed liquid for 30 minutes, white precipitate was obtained. After filtrating the precipitate and washing it with distilled water, it was dried all night long at 50.degree. C. in vacuum desiccator. The yield was 1.2 g. As a result of XRD measurement, strong scattering peaks of 2θ angle between 3 and 5° appeared. These peaks in small angle region suggest strongly the presence of periodic layered structure in the powder (FIG. 1.1). At the same time, in Raman spectroscopic measurement, spectrum patterns (145, 394, 513, 636 cm.sup.-1) derived from anatase crystals of titania appeared distinctly (FIG. 1.2). Further, in .sup.13C-NMR, a peak near 25 ppm derived from ethyleneimine (—NHCH$_2$CH$_2$—) carbons, peaks at 85 and 190 ppm derived from lactic acid residue of TC-310 raw material (FIG. 1.3 upper) appeared. These results suggest strongly the presence of layered structure (interlayer distance 2.86 nm) comprising organic compound and anatase crystal of titania in the powder sample.

Precursor Synthesizing Example 2

[A Layered Composite (PFe-20) of Polyethyleneimine and Titania Containing Iron Ion]

Water-soluble titanium compound TC-310 was mixed with 25% aqueous ammonia, and aqueous solution TC-310 of 28 volume % concentration (pH=9) was prepared. On the other hand, aqueous solution was prepared in which polyethyleneimine (SP-200) and iron nitrate (FeNO$_3$)$_3$ were included, which the mol ratio of ethyleneimine unit to iron ion became 20/1, and which concentration of ethyleneimine became 2 wt %. While stirring, the titanium aqueous solution of 20 ml was added dropwise into the polyethyleneimine aqueous solution of 20 ml. The mixed solution was stirred for 30 minutes, and a light brown precipitate was obtained. After the precipitate was filtered and washed with distilled water, dried in a vacuum desiccator at 50° C. all night long. The yield was 1.12 g. As a result of XRD measurement, strong peaks of 2θ angle between 3 and 5° appeared. The peaks of small angle region suggest strongly the presence of periodic layered structure in the powder (FIG. 2.1). At the same time, in Raman spectroscopic measurement, spectrum pattern (145, 394, 513, 636 cm$^{-1}$) derived from anatase crystal of titania appeared distinctly (FIG. 2.2). Also, in $^{13}$C-NMR, a peak near 25 ppm derived from carbon in ethyleneimine and peaks at 85 and 190 ppm derived from lactic acid residue desorbed from TC-310 raw material appeared (FIG. 2.3). These results suggest strongly the presence of layered structure comprising organic compound and anatase crystal of titania in the powder sample.

Precursor Synthesizing Examples 3 to 6

[Layered Composites of Polyethyleneimine and Titania with Different Containing Amount of Iron Ion]

In aqueous polyethyleneimine of 2 wt %, except to use aqueous solution with mol ratio of ethyleneimine unit to iron ion of 10/1, 50/1, 100/1, and 200/1, in the same way with the synthesizing example 2, composites PFe-10, PFe-50, PFe-100 and PFe-200 were synthesized. Those results were summarized in table 1.

TABLE 1

| synthesizing example | 2 | 3 | 4 | 5 | 6 |
|---|---|---|---|---|---|
| sample name | PFe-20 | PFe-10 | PFe-50 | PFe-100 | PFe-200 |
| interlayer distance (nm) | 2.99 | 3.05 | 3.01 | 3.02 | 2.98 |
| yield (g) | 1.12 | 1.20 | 1.06 | 1.07 | 1.10 |

Precursor Synthesizing Examples 7 to 11

[Layered Composites of Polyethyleneimine and Titania Containing Zinc, Manganese, Copper, Cobalt, Nickel]

In aqueous polyethyleneimine of 2 wt %, except to use aqueous solution containing metal ion(s) of zinc, manganese, copper, cobalt and nickel, with mol ratio of ethyleneimine unit to metal ions in metal nitrate of 20/1, in the same way with the synthesizing example 2, composites PZn-20, PMn-20, PCu-20, PCo-20 and PNi-20 were synthesized. Those results were summarized in table 2.

TABLE 2

| synthesizing example | 7 | 8 | 9 | 10 | 11 |
|---|---|---|---|---|---|
| sample name | PZn-20 | PMn-20 | PCu-20 | PCo-20 | PNi-20 |
| interlayer distance (nm) | 3.04 | 2.92 | 3.01 | 3.02 | 2.98 |

Precursor Synthesizing Examples 12 to 16

[Layered Composites of Chromium and Titania]

In polyethyleneimine aqueous solution of 2 wt %, except to use aqueous solution with mol ratio of ethyleneimine unit to chromium ion of 25/1, 50/1, 100/1, 200/1 and 500/1, in the same way with the synthesizing example 2, composites PCr-25, PCr-50, PCr-100, PCr-200 and PCr-500 were synthesized. Those results were summarized in table 3.

TABLE 3

| synthesizing example | 12 | 13 | 14 | 15 | 16 |
|---|---|---|---|---|---|
| sample name | PCr-25 | PCr-50 | PCr-100 | PCr-200 | PCr-500 |
| interlayer distance (nm) | 2.12 | 3.03 | 2.94 | 2.91 | 2.97 |
| yield (g) | 1.14 | 1.22 | 1.01 | 1.12 | 1.16 |

Example 1

[Synthesizing of Doped Titanium Oxide (T-01)]

Putting powder of layered composite precursor P1 obtained in the synthesizing example 1 of 1 g into an aluminum crucible, heating it in an electric furnace up to 400° C., then it was preburned at the temperature for an hour. After that, introducing nitrogen gas (the flow rate of nitrogen gas was about 200 ml/min) into the furnace, raising the temperature inside the furnace up to 500° C., holding under the condition for three hours, then the temperature was lowered to room temperature with nature cooling. Grey powder (T-01) was obtained by its burning with heat. The yield was 0.5 g.

By observation with a high resolution transmission electron microscope of T-01 powder sample, crystalline size appears in the range from 5 to 10 nm (FIG. 3.1). At the same time, as a result of XRD measurement, a scattering pattern (FIG. 3.2) which supported anatase crystal was distinct, and the crystal size calculated from the half-width of the scattering peak (2θ=25.7° was about 9 nm. In addition, in reflection spectrum, absorption was strong over the whole region of visible light, which spread over near infrared region (FIG. 3.3). Further, in $^{13}$C-NMR, peaks showing the presence of sp$^2$ bond of carbon atoms near 130 ppm appeared distinctly (FIG. 3.4 lower). Namely, carbon atoms of sp$^2$ bond state are present in T-01. From thermogravimetric analysis, weight loss (vanishing of carbon kind) in the temperature range from 200 to 500° C. was 10.22 wt % (FIG. 3.5). Particularly, in ESR measurement of the powder sample at room temperature (25° C.), a strong peak with g value of 1.9943 appeared (FIG. 3.6).

Example 2

[Synthesizing of Doped Titanium Oxide (TFe-10, TFe-20, TFe-50, TFe-100, TFe-200)]

Except to use the layered composite precursors PFe-10, PFe-20, PFe-50, PFe-100 and PFe-200 obtained in synthesizing example from 2 to 6, burning with heat in the same way and under the same condition with the example 1, light brown powders (referred to respectively as TFe-10, TFe-20, TFe-50, TFe-100, TFe-200) were obtained.

By observation with a high resolution transmission electron microscope of TFe-20 powder sample, crystalline size appears in the range from 5 to 10 nm (FIG. 4.1). At the same time, as a result of XRD measurement, a scattering pattern (FIG. 4.2) which supported anatase crystal appeared distinctly. In addition, in reflection spectrum, absorption was strong over the whole region of visible light, which spread over near infrared region (FIG. 4.3). Further, in $^{13}$C-NMR, peaks showing the presence of sp$^2$ bond of carbon atoms near 130 ppm appeared distinctly (FIG. 4.4). Namely, a carbon kind of sp$^2$ bond state is present in TFe-20 powder. From the thermogravimetric analysis, weight loss (vanishing of carbon kind) in the span from 200 to 500° C. was 10.22 wt % (FIG. 4.5). Particularly, in ESR measurement of the powder sample at room temperature (25° C.), a strong peak with g value of 1.9943 appeared (FIG. 4.6).

Example 3

[Synthesizing of Doped Titanium Oxide (TZn-20, TMn-20, TCu-20, TCo-20, TNi-20)]

Except to use precursors PZn-20, PMn-20, PCu-20, PCo-20 and PNi-20 obtained in synthesizing examples from 7 to 11, burning with heat in the same way and under the same condition with example 1, the respective colored powders (respectively referred to as TZn-20, TMn-20, TCu-20, TCo-20, Tni-20) were obtained.

Example 4

[Synthesizing of Doped Titanium Oxide (TCr-20, TCr-50, TCr-100, TCr-200, TCr-500)]

First, precursors obtained in the synthesizing examples from 12 to 16 were put into a furnace, heated up to 400° C. under air atmosphere. After burning 30 minutes at the temperature, with introducing nitrogen gas, raising the temperature up to 900° C., and the precursors were hold for 60 minutes at the temperature. After that, the temperature was lowered under nitrogen atmosphere to room temperature. By the method, black powders (respectively TCr-25, TCr-50, TCr-100, TCr-200, TCr-500) were obtained. From XDR measurement of these samples, they were confirmed to be rutile titanium oxide (FIG. 6.1). From ESR measurement, radical peaks appeared respectively (FIG. 6.2). From Raman spectroscopic measurement, vibration derived from amorphous carbon and graphite carbon in the range of 1200 to 1700 cm$^{-1}$ were observed (FIG. 6.3). From thermogravimetric analysis, weight loss (vanishing of carbon kind) of TCr50 powder in the temperature range from 200 to 500° C. was 13.3%.

Examination Example 1 and Comparative Examination Examples 1 to 2

[Decolorization Reaction of Methylene Blue Under Visible Light Irradiation Using T-01]

Adding methylene blue aqueous solution (10 ppm) of 20 ml and T-01 powder sample of 200 mg into a transparent glass bottle of 50 ml, the mixture was stirred for 10 minutes in the darkness, and then it was settled for 4 hours. After that, absorbance of the supernatant was measured, and it was made to be the initial concentration of methylene blue before light irradiation (0 hour). Irradiating the sample bottle under fluorescent light irradiation apparatus (light of 420 nm and under was cut off) with the quantity of light of 500 lx, liquid of 0.2 ml was taken out at intervals of a fixed time, and the absorbance was measured. Absorption spectrum (FIG. 7.1) and concentration change of methylene blue with time in the solution (FIG. 7.3) were shown. Decolorization progressed with light irradiation time, and methylene blue of 90% was decomposed in only an hour. As a comparative examination example 1, decolorization in a system using titanium oxide "AEROXIDE P25" made by Deggusa (Degussa Co., Ltd.) progressed scarcely (FIG. 7.2 and FIG. 7.3). Also, as comparative examination example 2, similar experiment was performed using visible light absorbing titanium oxide powder MPT-623 (made by ISHIHARA SANGYO KAISHA, LTD.), and after passing 3 hours, the degree of decolorization did not reach 67% or less.

Still, titanium oxide "AEROXIDE P25" made by Deggusa (Degussa Co., Ltd.) used as a comparative is a ultraviolet-responsive photocatalyst, resonance signals in the range with g value from 1.5 to 2.5 in ESR at room temperature in the darkness can not be observed, and peaks in $^{13}$C-NMR can not be observed. Moreover, visible light absorbing titanium oxide powder MPT-623 (made by ISHIHARA SANGYO KAISHA, LTD.) is a titanium oxide adsorbed with platinum nanoparticles, resonance signals with g value in the range from 1.5 to 2.5 in ESR at room temperature in the darkness can not be substantially observed, furthermore, peaks in $^{13}$C-NMR can not be observed, and the bounds for absorption were in the region of ultraviolet to 500 nm.

Similar reaction was performed with a light irradiation apparatus having natural light simulating lamp, the reaction rate was more rapid, methylene blue of 85% disappeared in about 30 minutes. In case of P25 used in comparative example, only 50% or less was decolorized in 30 minutes (FIG. 7.4). In addition, in the system using MPT-623, decolorization was 80%.

Examination Example 2

[Decolorization Reaction of Methylene Blue Under Visible Light Irradiation Using Doped Titanium Oxide TFe-20]

Adding methylene blue aqueous solution (10 ppm) of 20 ml and TFe-20 powder sample of 200 mg into a transparent glass bottle of 50 ml, the mixture was stirred for 10 minutes in the darkness, then it was settled for 4 hours. After that, absorbance of the supernatant was measured, and it was made to be the initial concentration of methylene blue before light irradiation (0 hour). Irradiating the sample bottle under fluorescent light irradiation apparatus (light of 420 nm and under was cut off) with the quantity of light of 500 lx, liquid of 0.2 ml was taken out at intervals of a fixed time, and the absorbance was measured. Absorption spectrum (FIG. 8.1) and concentration change of methylene blue with time in the solution (FIG. 8.2) were shown. Decolorization progressed with light irradiation time, and methylene blue of 90% was decomposed in only an hour. In the figure, as a comparison, data of P25 are described together.

Similar reaction was performed with a light irradiation apparatus having natural light simulating lamp, the reaction rate was more rapid, methylene blue of 90% was disappeared in about 30 minutes (FIG. 8.3). In the figure, as a comparison, data of P25 are described together.

Examination Example 3

[Decolorization Reaction of Methylene Blue Under Visible Light Irradiation and a Repeat Use of the Catalyst Using a Doped Titanium Oxide TCr-50]

Adding methylene blue aqueous solution (10 ppm) of 20 ml and TCr-50 powder sample of 200 mg into a transparent glass bottle of 50 ml, the mixture was stirred for 10 minutes in the darkness, then it was settled for 4 hours. After that, absorbance of the supernatant was measured, and it was made to be the initial concentration of methylene blue before light irradiation (0 hour). Irradiating the sample bottle under fluorescent light irradiation apparatus (light of 420 nm and under was cut off) with the quantity of light of 500 lx, liquid of 0.2 ml was taken out at intervals of a fixed time during 3 hours, and the absorbance was measured. After that, irradiation was performed for 24 hours, perfect decomposition of methylene blue was confirmed, then the reaction liquid was taken out, methylene blue liquid of 20 ml was added newly, irradiated in the above-described way, and the reaction was traced with absorbance measurement. The operation was repeated, and the reaction was performed 5 times. Methylene blue concentration change with time in the reaction liquid was shown in FIG. 9.1. Decolorization progressed with light irradiation time, and methylene blue decomposed perfectly in 24 hours. During repeated use, though a decrease of catalytic activity was present, but deactivation was not present with irradiation of 24 hours.

INDUSTRIAL APPLICABILITY

A doped titanium oxide of the present invention can be identified with the structure by various analytic methods, and a titanium oxide identified by the methods is distinct to have excellent properties as a photocatalyst. Therefore, a doped titanium oxide of industrial high usefulness is provided. In particular, a visible light-responsive photocatalyst of the present invention, in respect of containing a doped titanium oxide of the present invention, has high usefulness in respect to reveal the operation even where light of the region from ultraviolet to near infrared does not reach sufficiently.

Also, according to the production method of the present invention, not limited with a single kind of atom, doping with plural kinds of atoms simultaneously is possible, and a doped titanium oxide having wide bounds for absorption from visible light to near infrared is provided. Therefore, a doped titanium oxide of the present invention is useful in respect to be able to adjust easily kinds of doped atoms and doping amount according to applied field and use circumstances of the doped titanium oxide.

Further, by using a doped titanium oxide of the present invention in combination with various materials, it can be used as solar cell parts, hydrogen generating catalyst, fuel cell parts of hydrogen or alcoholic source system, and also in various regions such as a bacteria preventive agent, a bactericide, an anti-virus, cosmetics and so on is possible. Moreover, as a doped titanium oxide of the present invention shows absorption in near infrared region, it can be also applied for the use of electronic materials, electrical conducting materials, thermoelectric materials and so on.

The invention claimed is:

1. A production method of a doped titanium oxide which is doped at least with carbon atoms and nitrogen atoms, the production method comprising the steps of; (1) dispersing or dissolving basic polymer (x) having amino group(s) in aqueous medium, (II) obtaining a layered structure composite of polymer/titanium oxide wherein basic polymer (x) having amino group(s) is inserted among titanium oxide by mixing aqueous dispersion or aqueous solution obtained in (I) and water-soluble titanium compound (z) in aqueous medium, and by producing a hydrolytic reaction at a temperature of 50° C. or less, (III) doping with carbon atoms and nitrogen atoms in basic polymer (x) having amino group(s) to titanium oxide, by burning with heat the layered structure composite thus obtaining the doped titanium oxide with a crystalline surface.

2. A production method of a doped titanium oxide which is doped at least with carbon atoms, nitrogen atoms and metal ions, the production method comprising the steps of;
(I) dispersing or dissolving complex (y) of basic polymer (x) having amino group(s) aqueous medium,
(II) obtaining a layered structure composite of polymer/titanium oxide in which complex (y) of basic polymer (x) having amino group(s) and metal ions are inserted among titanium oxide by mixing aqueous dispersion or aqueous solution obtained in (I) and water-soluble titanium compound (z) in aqueous medium, and by producing hydrolytic reaction at a temperature of 50° C. or less,
(III) doping with carbon atoms, nitrogen atoms, and metal ions in complex (y) of basic polymer (x), having amino group(s) and metal ions to titanium oxide, by burning with heat the layered structure composite thus obtaining the doped titanium oxide with a crystalline surface.

* * * * *